United States Patent
Inaba et al.

(10) Patent No.: US 7,178,358 B2
(45) Date of Patent: Feb. 20, 2007

(54) VAPOR-COMPRESSION REFRIGERANT CYCLE SYSTEM WITH REFRIGERATION CYCLE AND RANKINE CYCLE

(75) Inventors: Atsushi Inaba, Kariya (JP); Yasushi Yamanaka, Nakashima-gun (JP); Shigeki Iwanami, Okazaki (JP); Koichi Ban, Tokai (JP); Shigeru Hisanaga, Kariya (JP); Tadashi Hotta, Okazaki (JP); Yukikatsu Ozaki, Gamagori (JP); Kazuhide Uchida, Hamamatsu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 205 days.

(21) Appl. No.: 10/765,761

(22) Filed: Jan. 27, 2004

(65) Prior Publication Data

US 2004/0216483 A1  Nov. 4, 2004

(30) Foreign Application Priority Data

| Jan. 27, 2003 | (JP) | .............................. 2003-017667 |
| May 19, 2003 | (JP) | .............................. 2003-139896 |
| Nov. 26, 2003 | (JP) | .............................. 2003-395603 |
| Dec. 9, 2003 | (JP) | .............................. 2003-410094 |

(51) Int. Cl.
  *F25B 1/00* (2006.01)
  *F25B 43/00* (2006.01)
  *F25B 27/00* (2006.01)

(52) U.S. Cl. ......................... 62/498; 62/512; 62/238.4

(58) Field of Classification Search .................. 62/498, 62/115, 512, 238.4, 323.2; 60/618, 653, 60/660
See application file for complete search history.

(56) References Cited

U.S. PATENT DOCUMENTS 6,581,384 B1 * 6/2003 Benson ........................ 60/653
6,928,820 B2 * 8/2005 Inaba et al. ................... 60/618

FOREIGN PATENT DOCUMENTS

| JP | 63-92021 | 6/1988 |
| JP | 2540738 | 7/1996 |
| JP | 3356449 | 10/2002 |

* cited by examiner

*Primary Examiner*—Chen Wen Jiang
(74) *Attorney, Agent, or Firm*—Harness, Dickey & Pierce, PLC

(57) ABSTRACT

A vapor-compression refrigerant cycle system with a refrigeration cycle and a Rankine cycle includes a compressor, a radiator, a gas-liquid separator, a decompression device and an evaporator. In the vapor-compression refrigerant cycle system, a liquid pump is disposed for supplying the liquid refrigerant in the gas-liquid separator to a heater for heating the refrigerant, a cooling means is provided for cooling the liquid refrigerant to be sucked into the liquid pump, and an energy recovery unit for expanding the refrigerant flowing out of the heater is disposed to recover thermal energy in the refrigerant from the heater. When the Rankine cycle is set so that the energy recovery unit recovers the thermal energy, the cooling means cools the liquid refrigerant to be sucked into the liquid pump. Therefore, pumping efficiency of the liquid pump can be effectively improved.

25 Claims, 11 Drawing Sheets

VAPOR-COMPRESSION REFRIGERANT CYCLE SYSTEM WITH REFRIGERATION CYCLE AND RANKINE CYCLE

CROSS REFERENCE TO RELATED APPLICATION

This application is based on Japanese Patent Applications No. 2003-17667 filed on Jan. 27, 2003, No. 2003-139896 filed on May 19, 2003, No. 2003-395603 filed on. Nov. 26, 2003 and No. 2003-410094 filed on Dec. 9, 2003, the disclosure of which is incorporated herein by reference.

FIELD OF THE INVENTION

The present invention relates to a vapor-compression refrigerant cycle system provided with a Rankine cycle for recovering thermal energy and a refrigeration cycle for performing a cooling operation. The vapor-compression refrigerant cycle system is suitably used for an air conditioner for a vehicle.

BACKGROUND OF THE INVENTION

In a conventional vapor-compression refrigerant cycle system provided with a Rankine cycle, a compressor of a vapor-compression refrigerant cycle is used as an expansion device in a case where an energy recovery is performed by the Rankine cycle.

For example, in a vapor-compression refrigerant cycle system with a Rankine cycle described in JP Patent No. 3356449, a single heat exchanger is used to function as an evaporator for absorbing heat from air at the time of a refrigeration cycle to thereby evaporate a refrigerant, and is also used to function as a heater for heating the refrigerant by use of a high-temperature heat source at the time of a Rankine cycle. In the case where the heat exchanger is used as both the heater and the evaporator, respective temperature zones of these two functions differ by far from each other. Thus, when the heat exchanger is configured so as to be adaptable as the evaporator, it becomes difficult for the heat exchanger to effectively recover external waste heat by functioning as the heater.

Generally, a compressor of the vapor-compression refrigerant cycle system is for sucking a gas, such as a gas refrigerant and the like, into an operation chamber by giving mechanical energy thereto from outside, and subsequently, reducing a volume of the operation chamber so as to compress the gas to be discharged. On the other hand, an expansion device is for introducing the gas at high-pressure into an operation chamber, and for expanding the operation chamber by the agency of a pressure of the gas to thereby take out mechanical energy. Accordingly, in order to make use of a compressor of a rotary type such as a scroll type as an expansion device, there is the need for reversing the flow of the refrigerant.

In a vapor-compression refrigerant cycle system described in JP-U 63-92021, however, in a case of operating a compressor device so as to function as a compressor for exhibiting refrigeration capacity as well as in a case of operating the compressor device so as to function as an expansion device for executing an energy recovery, a flow of a refrigerant in a compressor part of the compressor device, is in the same direction. For this reason, the flow of the refrigerant in the compressor part of the compression device in the case of operating the compressor device so as to function as the compressor, is not reversed from that in the case of operating the compressor device so as to function as the expansion device.

Further, in a vapor-compression refrigerant cycle system described in JP patent No. 2540738, a refrigerant inlet as well as a refrigerant outlet of an expansion device (compressor), when an energy recovery is performed, is set on the same side as a refrigerant inlet as well as a refrigerant outlet of the compressor (expansion device) when the vapor-compression refrigerant cycle system is operated to have the refrigeration capacity. Accordingly, in the case of using a scroll type compressor, it is impossible to effectively operate the single compressor so as to function as an expansion device. Therefore, either normal operation of a Rankine cycle or normal operation of the vapor-compression refrigerant cycle cannot be performed in practice.

In addition, in this vapor-compression refrigerant cycle system described in JP patent No. 2540738, a liquid pump is necessary to send refrigerant to a vapor generator. However, in a case where the liquid pump sucks the refrigerant, a pressure at a suction side of the liquid pump is reduced, and the sucked refrigerant is partially boiled and evaporated. In this case, a pump efficiency of the liquid pump is decreased, and cavitation is readily caused in the liquid pump.

SUMMARY OF THE INVENTION

In view of the above-described problems, it is an object of the present invention to provide a vapor-compression refrigerant cycle system provided with a Rankine cycle and a refrigeration cycle that can be effectively operated.

It is another object of the present invention to provide a vapor-compression refrigerant cycle system with a Rankine cycle that prevents a pumping efficiency of a liquid pump from being reduced.

According to the present invention, a vapor-compression refrigerant cycle system includes a compressor for sucking and compressing refrigerant, a radiator provided at a refrigerant discharge side of the compressor for cooling the refrigerant, a gas-liquid separator for separating the refrigerant from the radiator into gas refrigerant and liquid refrigerant, a decompression device for decompressing the liquid refrigerant flowing out of the gas-liquid separator, an evaporator for evaporating the refrigerant after being decompressed in the decompression device, a heater for heating the refrigerant, a liquid pump for supplying the liquid refrigerant in the gas-liquid separator to the heater, a cooling means for cooling the liquid refrigerant to be sucked into the liquid pump, an energy recovery unit for expanding the refrigerant flowing out of the heater to recover thermal energy in the refrigerant from the heater, and a switching means for switching between a refrigeration cycle where the evaporator has a refrigeration capacity and a Rankine cycle where the energy recovery unit recovers the thermal energy. In the vapor-compression refrigerant cycle system, when the refrigeration cycle is set, the refrigerant is circulated in this order of the compressor →the radiator→the gas-liquid separator→the decompression device→the evaporator→the compressor. Further, when the Rankine cycle is set in the vapor-compression refrigerant cycle system, the refrigerant is circulated in this order of the gas-liquid separator the liquid pump→the heater→the energy recovery unit the radiator the gas-liquid separator, and the cooling means cools the liquid refrigerant to be introduced into the liquid pump in the Rankine cycle. Accordingly, a super-cooling degree of the liquid refrigerant sucked into the liquid pump can be effectively reduced, and it can prevent the sucked liquid refrigerant of the liquid pump from being evaporated (boiled). Thus, the efficiency of the liquid pump can be effectively improved.

Preferably, the radiator is connected to the refrigerant discharge side of the compressor through a refrigerant circuit, the switching means includes a switching member that is disposed in the refrigerant circuit to shut a refrigerant flow from the refrigerant discharge side of the compressor to the radiator in the Rankine cycle, and the liquid pump is provided to supply the liquid refrigerant to the heater while bypassing the switching member in the Rankine cycle. Therefore, both of the refrigeration cycle and the Rankine cycle can be effectively operated.

More preferably, the heater is a vapor generator that generates a super-heated vapor refrigerant in the Rankine cycle, the energy recovery unit includes an expansion device that expands the super-heated vapor refrigerant from the heater in iso-entropy in the Rankine cycle, and the radiator is disposed to cool and condense the expanded refrigerant in the expansion device of the energy recovery unit in the Rankine cycle.

Further, the vapor-compression refrigerant cycle system includes an inner heat exchanger having a first refrigerant passage through which the liquid refrigerant in the gas-liquid separator is introduced into the liquid pump, and a second refrigerant passage through which the refrigerant decompressed in the decompression device flows. In this case, before the liquid pump is operated in the Rankine cycle, the switching means is operated to set a start mode where the refrigerant is circulated in this order of the compressor→the heater→the radiator→the gas-liquid separator→the decompression device→the inner heat exchanger→the compressor. Therefore, when the Rankine cycle is operated, the super-cooling degree of the liquid refrigerant to be supplied to the suction side of the liquid pump can be sufficiently cooled.

For example, the liquid pump is operated in the Rankine cycle, after the start mode is performed for a predetermined time. Alternatively, the start mode is performed until an amount of the liquid refrigerant in the gas-liquid separator becomes equal to or larger than a predetermined value, and the liquid pump is operated in the Rankine cycle after the amount of the liquid refrigerant in the gas-liquid separator becomes the predetermined value. Alternatively, the start mode is performed until a super-cooling degree of the liquid refrigerant in the gas-liquid separator becomes equal to or larger than a predetermined value, and the liquid pump is operated in the Rankine cycle after the super-cooling degree of the liquid refrigerant in the gas-liquid separator becomes the predetermined value.

Further, in the start mode, the refrigerant decompressed in the decompression device can be evaporated in the second refrigerant passage of the inner heat exchanger by absorbing heat in the refrigerant of the first refrigerant passage between the gas-liquid separator and the liquid pump, so as to have a cooling capacity.

In addition, in the vapor-compression refrigerant cycle system, the cooling means can be an electronic refrigerator using a Peltier effect, or can be a super-cooler that cools the liquid refrigerant from the gas-liquid separator by using outside air.

More preferably, an additional pump is provided for supplying the liquid refrigerant in the gas-liquid separator into a suction side of the liquid pump. In this case, the pressure of liquid refrigerant at the suction side of the liquid pump can be increased, and it can further prevent the liquid refrigerant from being boiled in the liquid pump. The additional pump can be integrated with the gas-liquid separator. In this case, at least a suction side of the additional pump is disposed in the liquid refrigerant of the gas-liquid separator. Further, the liquid pump and the additional pump can be integrated with the gas-liquid separator.

In the vapor-compression refrigerant cycle system, the compressor and the energy recovery unit can be integrated. Alternatively, the energy recovery unit can be arranged in parallel with the compressor in a refrigerant flow. Further, the heater heats the refrigerant by using waste heat generated from an equipment mounted on a vehicle, such as an engine.

Further, according to another aspect of the present invention, a vapor-compression refrigerant cycle system includes a compressor for sucking and compressing refrigerant, a radiator provided at a refrigerant discharge side of the compressor for cooling the refrigerant, a decompression device for decompressing refrigerant flowing out of the radiator, an evaporator for evaporating the refrigerant after being decompressed in the decompression device, a refrigerant shutting unit disposed in a refrigerant circuit between the radiator and a refrigerant discharge side of the compressor to shut a refrigerant flow from the refrigerant discharge side of the compressor to the radiator, a heater for heating the refrigerant, a refrigerant supply means for supplying refrigerant to the heater while bypassing the refrigerant shutting unit, and an energy recovery unit for expanding the refrigerant flowing out of the heater to recover thermal energy in the refrigerant from the heater. In the vapor-compression refrigerant cycle system, when a refrigeration cycle where the evaporator has a refrigeration capacity is set, the refrigerant is circulated in this order of the compressor→the radiator→the decompression device→the evaporator→the compressor. On the other hand, when a Rankine cycle where the energy recovery unit recovers the thermal energy is set, the refrigerant shutting unit shuts the refrigerant flow from the refrigerant discharge side of the compressor to the radiator, and the refrigerant is circulated by the refrigerant supply means in this order of the heater→the energy recovery unit→the radiator→the heater. Thus, the Rankine cycle can be accurately operated, and a switching operation between the refrigeration cycle and the Rankine cycle can be readily performed.

Even in this case, the energy recovered by the energy recovery unit can be stored by energy storage means. For example, the energy storage means includes a capacitor. Further, the energy storage means can store the energy recovered in the energy recovery unit as a mechanical energy. Alternatively, the energy recovery unit generates an electric energy by use of the recovered energy.

Further, the compressor can be driven by an electric motor. Alternatively, the compressor can be disposed to be driven by plural kinds of driving sources, or a driving source other than an electric motor.

In addition, the heater can heat the refrigerant by using waste heat generated by a heat engine, such as heat of exhaust gas discharged from the heat engine, or by using waste heat generated by equipment mounted on a vehicle. Further, the heater can heat the refrigerant by use of a plurality of heat sources.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
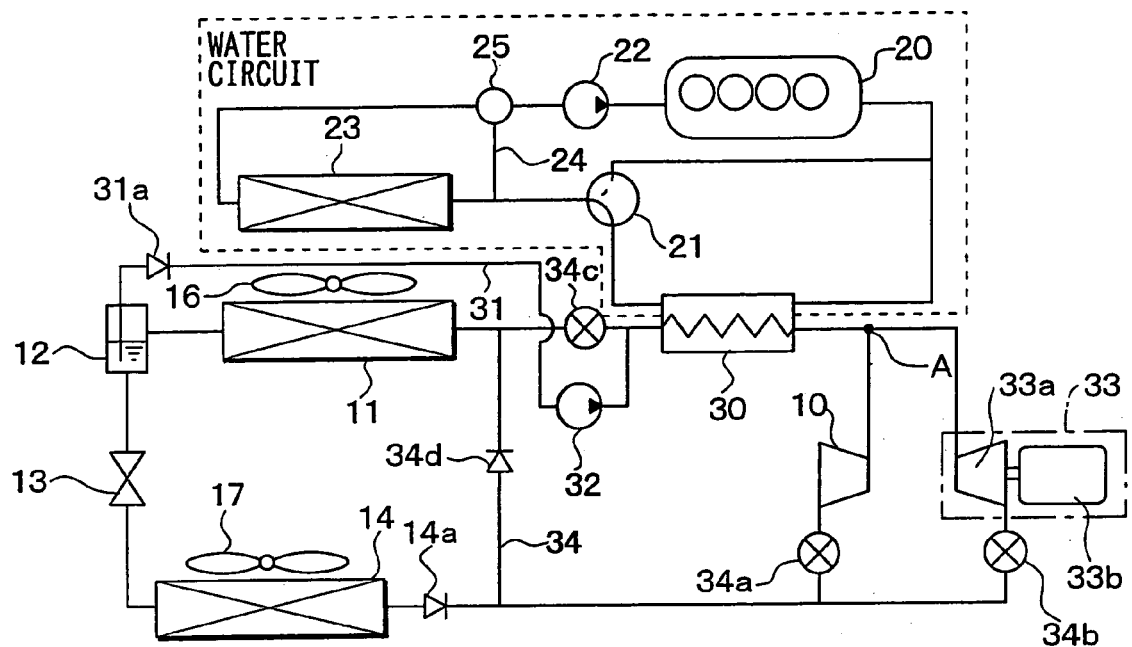
FIG. 1 is a schematic diagram of a Rankine vapor-compression refrigerant cycle system according to a first embodiment of the present invention.

In the first embodiment, a Rankine vapor-compression refrigerant cycle system is a vapor-compression refrigerant cycle system provided with a Rankine cycle and a refrigeration cycle. Further, the Rankine vapor-compression refrigerant cycle system of the present invention is typically used for a vehicle. FIG. 1 is a schematic diagram of the Rankine vapor-compression refrigerant cycle system according to the present embodiment.

The vapor-compression refrigerant cycle system provided with the Rankine cycle, according to the present embodiment, is intended to recover energy from waste heat generated by an engine 20 serving as a heat engine for generating a motive power for running, and also to utilize cold and heat derived from the vapor-compression refrigerant cycle, for the purpose of air conditioning. The vapor-compression refrigerant cycle system provided with the Rankine cycle is described hereinafter.

A compressor 10 is for sucking and compressing a refrigerant by using the agency of a motive power delivered from an electric motor. A radiator 11 is a cooler connected to a discharge side of the compressor 10, for cooling the refrigerant while radiating heat. A fan 16 sends wind to the radiator 11 for radiating heat, and is disposed along with the radiator 11 inside an engine room.

A gas-liquid separator 12 is a receiver for performing a separation of the refrigerant flowing out of the radiator 11 into a gas phase refrigerant and a liquid phase refrigerant. A decompression device 13 is for decompressing and expanding the liquid phase refrigerant separated in the gas-liquid separator 12. In the present embodiment, the decompression device 13 is a thermal type expansion valve capable of controlling a throttle opening such that the liquid phase refrigerant undergoes pressure reduction is entropically while a super-heating degree of the refrigerant sucked by the compressor 10 will be set at a predetermined value.

An evaporator 14 is a heat absorber for evaporating the liquid phase refrigerant after performing the pressure reduction in the decompression device 13, thereby obtaining a heat absorbing effect. The compressor 10, the radiator 11, the gas-liquid separator 12, the decompression device 13, the evaporator 14, and the like construct the vapor-compression refrigerant cycle for transferring heat on a lower temperature side to a higher temperature side. A fan 17 is for blowing outside air (i.e., air outside the passenger compartment in this embodiment) or inside air (i.e., air inside the passenger compartment in this embodiment) to the evaporator 14 for air conditioning of the passenger compartment, and is disposed inside an air conditioning unit.

A heater 30 is a heat exchanger provided in a refrigerant circuit interconnecting the compressor 10 and the radiator 11, for performing heat exchange between the refrigerant flowing in the refrigerant circuit and engine cooling water to thereby heat the refrigerant. A three-way valve 21 is capable of changing over between a case where the engine cooling water flowing out of the engine 20, is circulated to the heater 30, and a case where the engine cooling water flowing out of the engine 20 is not circulated to the heater 30.

A first bypass circuit 31 is a refrigerant path for guiding the liquid phase refrigerant, separated in the gas-liquid separator 12, toward a refrigerant inlet/outlet side of the heater 30, on the side of the radiator 11. The first bypass circuit 31 is provided with a liquid pump 32 for circulating the liquid phase refrigerant and a check valve 31a for only allowing the refrigerant to flow from the gas-liquid separator 12 toward the heater 30. In the present embodiment, the liquid pump 32, the first bypass circuit 31, the check valve 31a, and the like make up a refrigerant supplying means for supplying refrigerant to the heater 30. Further, in the present embodiment, the liquid pump 32 is a motor-driven pump, for example.

A refrigerant circuit arranged in parallel with the compressor 10 is provided with an energy recovery unit 33 for expanding a super-heated vapor refrigerant flowing out of the heater 30 to thereby recover thermal energy given to the heater 30. Further, in the present embodiment, the energy recovery unit 33 is constructed of an expansion device 33a and a generator 33b driven by mechanical energy delivered from the expansion device 33a.

Further, a second bypass circuit 34 is a refrigerant path for connecting a refrigerant outlet side of the expansion device 33a and a refrigerant inlet side of the radiator 11. The second bypass circuit 34 is provided with a check valve 34d for allowing the refrigerant to flow from the refrigerant outlet side of the expansion device 33a toward only the refrigerant inlet side of the radiator 11.

Further, a check valve 14a is provided for allowing the refrigerant to flow from a refrigerant outlet side of the evaporator 14 toward only a suction side of the compressor 10. Further, switching valves 34a to 34c are electromagnetic valves for opening and closing the refrigerant paths. The switching valves 34a to 34c, the three-way valve 21, and the like are controlled by an electronic controller (ECU). The switching valve 34c is for blocking a flow of the refrigerant from a refrigerant discharge side of the compressor 10 toward the radiator 11 at the time of a waste heat recovery operation as described later. Therefore, the switching valve 34c corresponds to refrigerant blocking means in the waste heat recovery operation according the present invention.

In addition, a water pump 22 is used for circulating the engine cooling water in a water circuit, and a radiator 23 is a heat exchanger for cooling the engine cooling water through heat exchange between the engine cooling water and outside air. A bypass circuit 24 is a detour circuit through which the engine cooling water flows while bypassing the radiator 23. A thermostat 25 is a flow rate regulating valve for adjusting a flow rate of the engine cooling water flowing into the bypass circuit 24 and a flow rate of the engine cooling water flowing into the radiator 23.

The water pump 22 is a mechanical pump driven by the motive power derived from the engine 20. However, needless to say, a motor-driven pump operated by an electric motor can be used instead.

Next, operation of the vapor-compression refrigerant cycle system according to the present embodiment and the effect thereof will be now described.

1. Air Conditioning Operation (refer to FIG. 2)

This air conditioning operation is an operation mode in which the refrigerant is cooled by the radiator 11 while the evaporator 14 is operated to have a refrigeration capacity. In the present embodiment, the vapor-compression refrigerant cycle system is operated only for a cooling operation and a dehumidifying operation, utilizing cold derived from the vapor-compression refrigerant cycle, that is, utilizing a heat absorption. However, the vapor-compression refrigerant cycle system is not operated for a heating operation utilizing heat derived from the radiator 11. The operation of the vapor-compression refrigerant cycle system even at the time of the heating operation is the same as that at the time of the cooling operation and dehumidifying operation.

Figure 2:
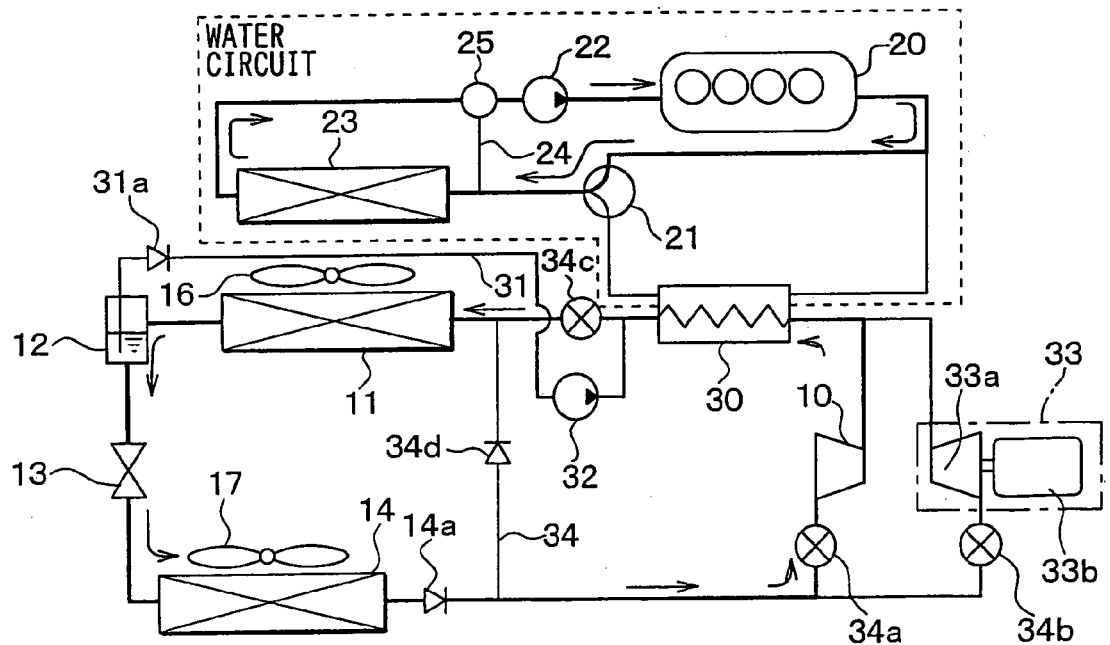
FIG. 2 is a schematic diagram of the Rankine vapor-compression refrigerant cycle system in an air conditioning operation, according to the first embodiment of the present invention.

More specifically, in the air conditioning operation, the liquid pump 32 is set at a stopped state, and the compressor 10 is operated while opening the switching valves 34a, 34c and closing the switching valve 34b. At the same time, the three-way valve 21 is operated as shown in FIG. 2, so that the engine cooling water is circulated while bypassing the heater 30.

As a result, the refrigerant is circulated in the order of the compressor 10→the heater 30→the radiator 11→the gas-liquid separator 12→the decompression device 13→the evaporator 14→the compressor 10. Since the engine cooling water is not circulated to the heater 30, the refrigerant is not heated in the heater 30, so that the heater 30 functions merely as a refrigerant path.

Accordingly, the low-pressure refrigerant after performing the pressure reduction in the decompression device 13 evaporates by absorbing heat from air blowing into the passenger compartment, and the gas phase refrigerant, generated after evaporation in the evaporator 14, is compressed in the compressor 10 to thereby reach a high temperature, and is cooled with outside air by the radiator 11 to be thereby condensed.

In the present embodiment, as the refrigerant, freon (HFC134a) is used. however, the refrigerant is not limited to HFC134a, and any one refrigerant that can be liquefied on a high-pressure side can be used. That is, a refrigerant containing at least one substance selected from the group consisting of, for example, HFC134a, HFC152a, butane, propane, and ammonia, as the main constituent, can be used.

2. Waste Heat Recovery Operation (refer to FIG. 3)

This waste heat recovery operation is an operation mode wherein waste heat of the engine 20 is recovered as reusable energy by stopping the operation of air conditioner, that is, the compressor 10.

Figure 3:
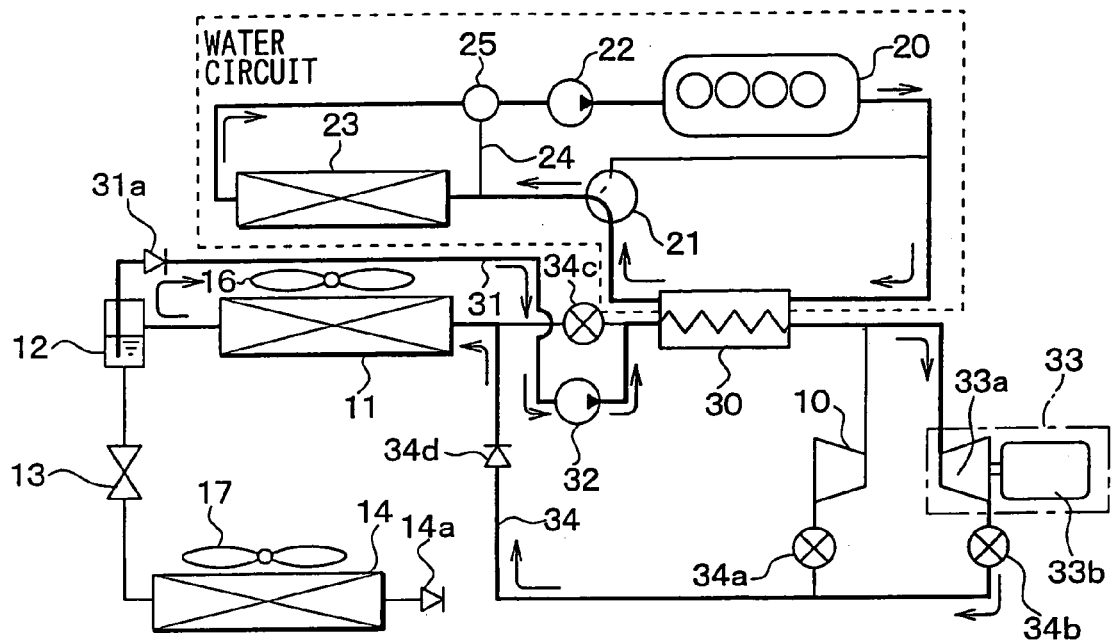
FIG. 3 is a schematic diagram of the Rankine vapor-compression refrigerant cycle system in a waste heat recovery operation, according to the first embodiment of the present invention.

More specifically, the switching valves 34a, 34c are set at a closed state, the liquid pump 32 is operated, and the compressor 10 is stopped while the switching valve 34b is opened. At the same time, the three-way valve 21 is operated as shown in FIG. 3 so that the engine cooling water flowing out of the engine 20 is circulated through the heater 30.

As a result, the refrigerant is circulated in the order of the gas-liquid separator 12→the first bypass circuit 31→the heater 30 the energy recovery unit 33 (the expansion device 33a)→the second bypass circuit 34→the radiator 11 the gas-liquid separator 12.

Accordingly, the super-heated vapor refrigerant heated in the heater 30 flows into the expansion device 33a, and the super-heated vapor refrigerant introduced into the expansion device 33a reduces an enthalpy thereof while performing isentropical expansion in the expansion device 33a. Hence the expansion device 33a provides the generator 33b with mechanical energy corresponding to a reduced portion of the enthalpy, and power generated by the generator 33b is stored in an electricity accumulator such as a battery, capacitor, and the like.

Further, the refrigerant flowing out of the expansion device 33a is cooled in the radiator 11 and condensed to be thereby stored in the gas-liquid separator 12. The liquid phase refrigerant inside the gas-liquid separator 12 is sent out toward the heater 30 by the liquid pump 32. In this connection, the liquid pump 32 pumps and sends out the liquid phase refrigerant into the heater 30 at a pressure so as not to permit backward flow of the super-heated vapor refrigerant, generated after being heated in the heater 30, toward the gas-liquid separator 12.

As described above, in the present embodiment, the thermal energy that is discarded in the form of heat into the atmosphere by the radiator 23 is converted into easily reusable energy such as electric power, and the like, so that it is possible to improve fuel economy of a vehicle, that is, to lower specific fuel consumption of the engine 20.

Further, in the present embodiment, because power generation is performed by using the waste heat, the need for driving a generator such as an alternator and the like by directly using the engine 20 is reduced. Therefore, the specific fuel consumption of the engine 20 can be further reduced.

Generally, the evaporator 14 cools air for air conditioning, and the heater 30 heats the refrigerant with the use of a high-temperature heat source. Therefore, respective functions of the evaporator 14 and the heater 30 differ from each other, and respective using temperature zones considerably differ from each other. Accordingly, as in the present embodiment, when the evaporator 14 and the heater 30 are installed independently from each other, both can be made to specifications that suit to respective applications while a changeover between the refrigeration cycle and the Rankine cycle can be performed.

Furthermore, in the present embodiment, the heater 30 is installed in a portion of the refrigerant circuit, closer to the radiator 11 than a joint point A (refer to FIG. 1) between a refrigerant discharge side of the compressor 10 and a refrigerant inlet side of the expansion device 33a. However, the heater 30 may be installed in the refrigerant circuit for connecting the refrigerant inlet side of the expansion device 33a and the joint point A.

(Second Embodiment)

Figure 4:
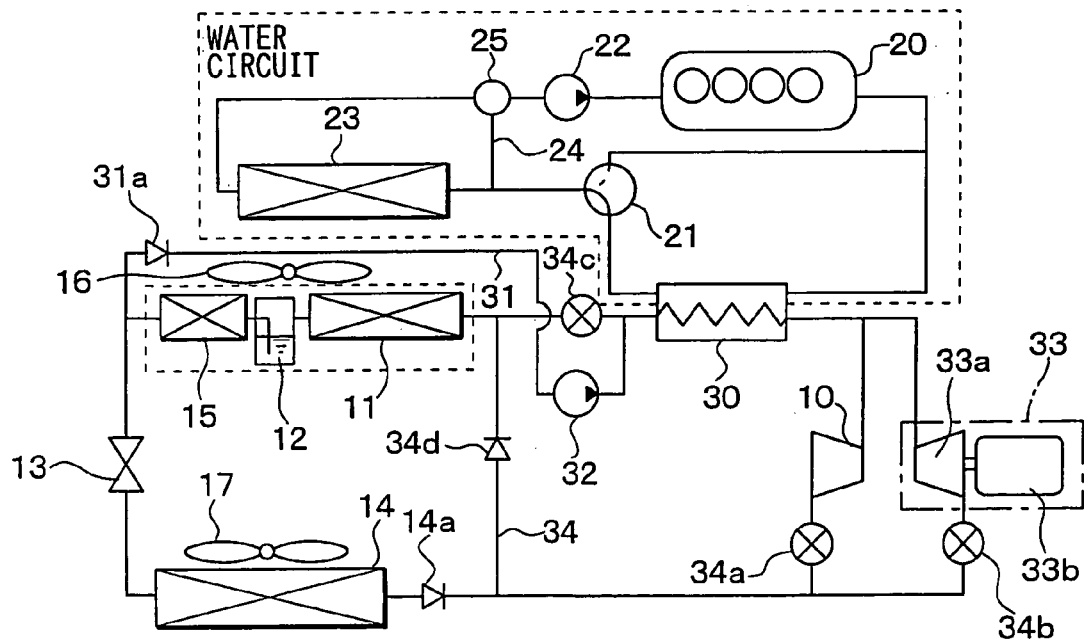
FIG. 4 is a schematic diagram of a Rankine vapor-compression refrigerant cycle system according to a second embodiment of the present invention.

The second embodiment of the present invention will be now described with reference to FIG. 4. In the second embodiment, as shown in FIG. 4, there is provided a super-cooler 15 for further cooling a liquid phase refrigerant separated in the gas-liquid separator 12, to thereby enhancing a super-cooling degree of the refrigerant.

In the second embodiment, the first bypass circuit 31 through which liquid refrigerant is supplied to the liquid pump 32 is connected to a refrigerant outlet side of the super-cooler 15. The super-cooler 15 further cools the liquid phase refrigerant from the gas-liquid separator 12. Therefore, it can prevent the liquid phase refrigerant, to be sucked into the liquid pump 32 from being evaporated, thereby preventing damage due to cavitation from occurring to the liquid pump 32, and preventing resultant deterioration in pump efficiency. However, as in the case of the first embodiment, the first bypass circuit 31 at the side of the gas-liquid separator 12 can be connected to the liquid outlet portion of the gas-liquid separator 12. Alternatively, the decompression device 13 can be connected to the liquid outlet portion of the gas-liquid separator 12 while the first bypass circuit 31 at the side of the gas-liquid separator 12 is connected to the outlet of super-cooler 15.

In the second embodiment, the other parts are similar to those of the above-described first embodiment.

(Third Embodiment)

Figure 5:
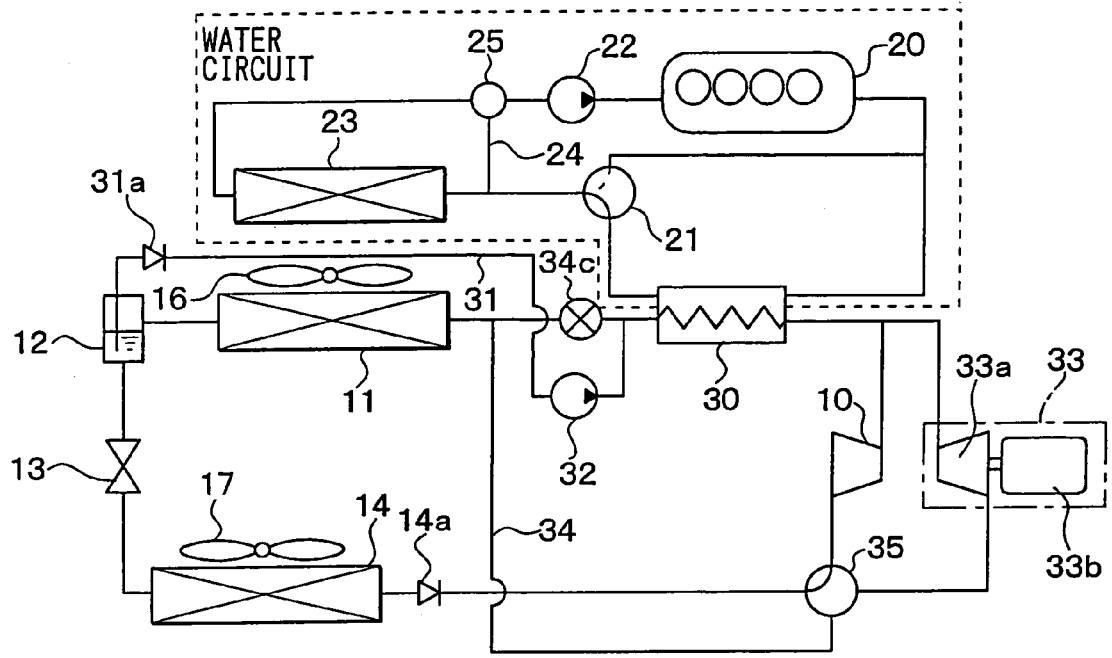
FIG. 5 is a schematic diagram of a Rankine vapor-compression refrigerant cycle system according to a third embodiment of the present invention.

The third embodiment of the present invention will be now described with reference to FIG. 5. In the third embodiment, as shown in FIG. 5, refrigerant paths are changed over by using a changeover valve 35 in place of the switching valves 34a to 34c. More specifically, the changeover valve 35 opens one of two refrigerant paths, and closes the other thereof.

Further, FIG. 5 shows a case where the present embodiment is applied to the first embodiment, however, the present embodiment may be applied to the second embodiment. In the third embodiment, the other parts are similar to those of the above-described first or second embodiment.

(Fourth Embodiment)

Figure 6:
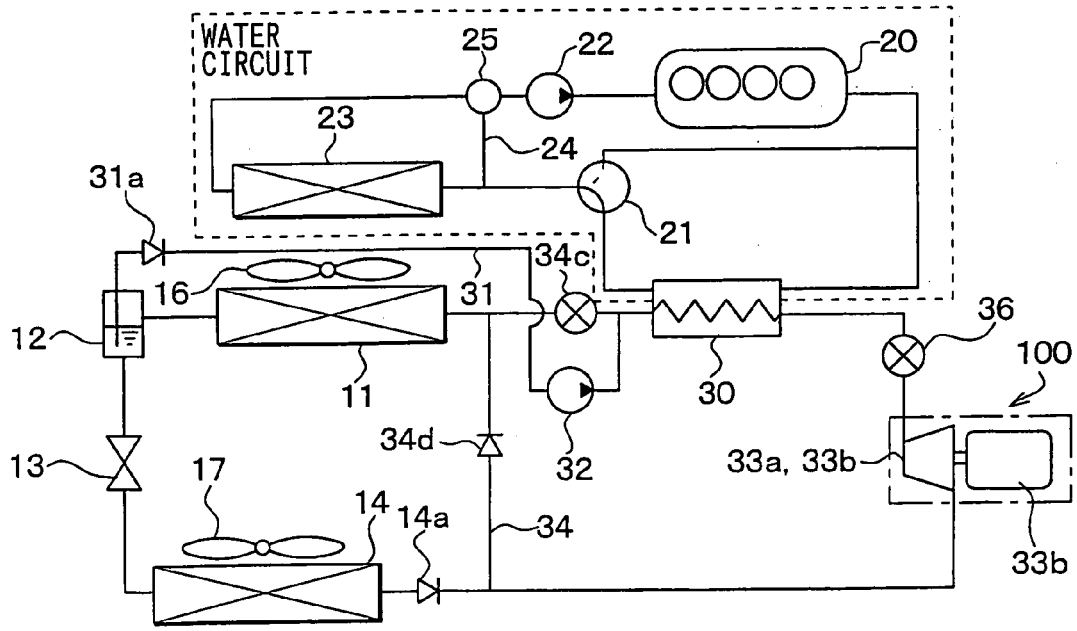
FIG. 6 is a schematic diagram of a Rankine vapor-compression refrigerant cycle system according to a fourth embodiment of the present invention.

The fourth embodiment of the present invention will be now described with reference to FIGS. 6–7B. In the fourth embodiment, as shown in FIG. 6, an expending and compressing device 100 is used instead of the compressor 10 and the energy recovery unit 33. In the expanding and decompression device 100, the compressor 10 is combined with the energy recovery unit 33 (the expansion device 33a).

1. Air Conditioning Operation

In the air conditioning operation, the liquid pump 32 is set at a stopped state, and the expending and compressing device 100 is operated while opening the switching valve 34c. At the same time, a three-way valve 21 is operated, so that the engine cooling water is circulated while bypassing the heater 30.

In the present embodiment, when the expending and compressing device 100 is operated so as to function as a compressor, the generator 33b is operated as an electric motor.

As a result, the refrigerant is circulated in the order of the expending and compressing device 100→the heater 30→the radiator 11→the gas-liquid separator 12→the decompression device 13→the evaporator 14→the expending and compressing device 100. Since the engine cooling water is not circulated to the heater 30, the refrigerant is not heated in the heater 30, so that the heater 30 functions merely as a refrigerant path.

Accordingly, a low-pressure refrigerant after performing a pressure reduction in the decompression device 13 evaporates by absorbing heat from air blowing into a room (e.g., passenger compartment), and a gas phase refrigerant, generated after the evaporation, is compressed in the expending and compressing device 100 to thereby reach a high temperature, and is cooled by air outside the room by the radiator 11 to be thereby condensed.

2. Waste Heat Recovery Operation

When the waste heat recovery operation is set, the switching valve 34c is set at the closed state, the liquid pump 32 is operated, and the three-way valve 21 is operated so that the engine cooling water flowing out of the engine 20 is circulated through the heater 30.

As a result, the refrigerant is circulated in the order of the gas-liquid separator 12→the first bypass circuit 31→the heater 30→the expending and compressing device 100→the second bypass circuit 34→the radiator 11→the gas-liquid separator 12.

Accordingly, a super-heated vapor refrigerant heated in the heater 30 flows into the expending and compressing device 100 and the super-heated vapor refrigerant introduced into the expending and compressing device 100 reduces an enthalpy thereof while performing isentropical expansion in the expending and compressing device 100. Hence the expending and compressing device 100 provides the generator 33b with mechanical energy corresponding to a reduced portion of the enthalpy, and power generated by the generator 33b is stored in an electricity accumulator such as a battery, capacitor, and the like.

Figure 7A:
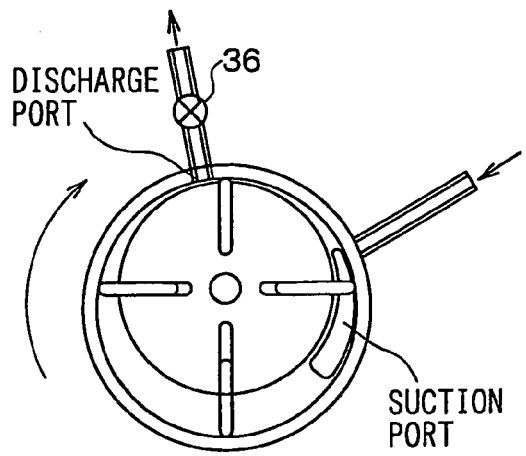
FIG. 7A is a schematic diagram of an expending and compressing device when being used as a compressor.
Figure 7B:
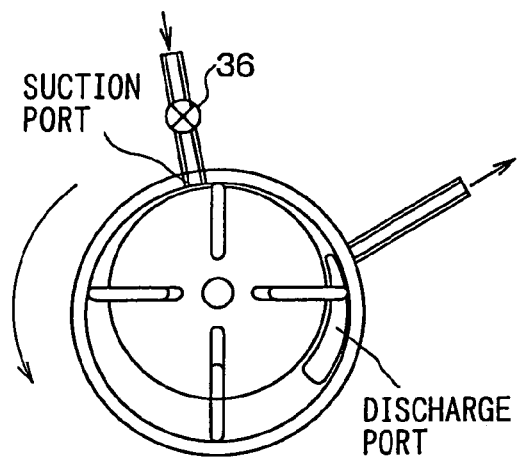
FIG. 7B is a schematic diagram of the expanding and compressing device when being used as an expansion device, according to the fourth embodiment of the present invention.

Further, FIG. 7A shows a case where the expending and compressing device 100 is operated as a compressor, and FIG. 7B shows a case where the expending and compressing device 100 is operated as an expansion device. In the present embodiment, the expending and compressing device 100 is constructed with a vane type fluid machine.

Further, when the expending and compressing device 100 is operated as the compressor, a control valve 36 functions as a discharge valve such as a check valve. On the other hand, when the expending and compressing device 100 is operated as the expansion device, the control valve 36 functions as a valve that opens.

FIG. 6 shows a case where the expanding and compressing device 100 of the present embodiment is applied to the first embodiment. However, the present embodiment may be applied to the second embodiment with the super-cooler 15.

(Fifth Embodiment)

Figure 8:
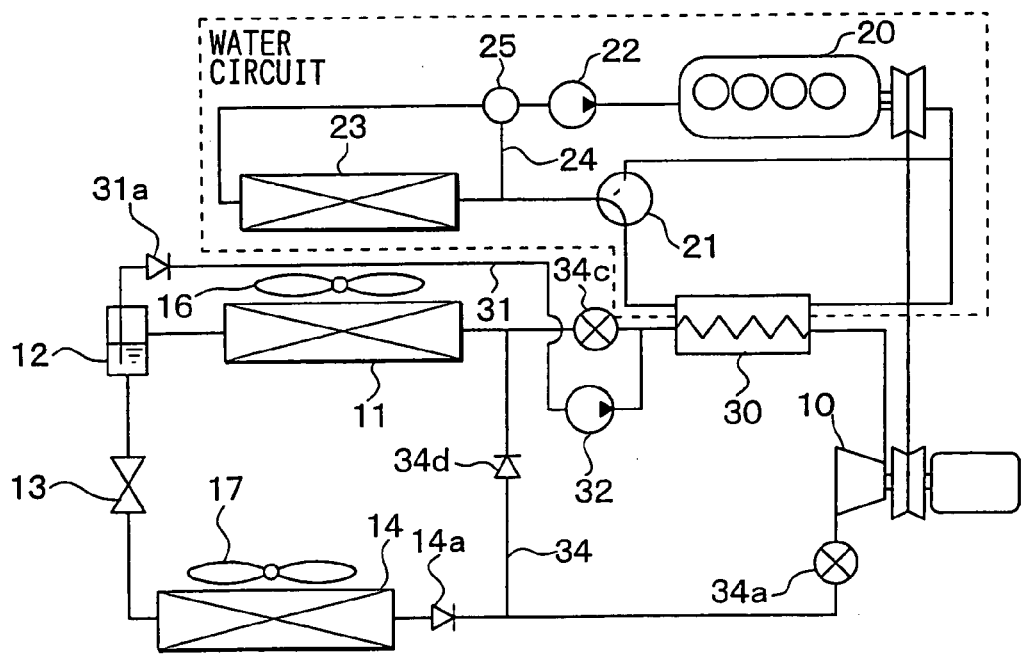
FIG. 8 is a schematic diagram of a Rankine vapor-compression refrigerant cycle system according to a fifth embodiment of the present invention.

The fifth embodiment of the present invention will be now described with reference to FIG. 8. In the fifth embodiment, as shown in FIG. 8, as the expending and compressing device 100, a hybrid type is used. In the hybrid type expanding and compressing device 100, the refrigerant is sucked and compressed by the agency of a motive power derived from a driving source other than an electric motor, that is, an engine 20, when the engine 20 is in operation. On the other hand, the refrigerant is sucked and compressed by the agency of the motive power derived from the electric motor when the engine 20 is not operated.

In the present embodiment, when the expending and compressing device 100 is operated so as to function as a compressor, the generator 33b is operated as the electric motor.

FIG. 8 shows a case where the present invention of the fifth embodiment is applied to the first embodiment. However, the present invention of the fifth embodiment can be applied to the second embodiment with the super-cooler 15.

(Sixth Embodiment)

Figure 9:
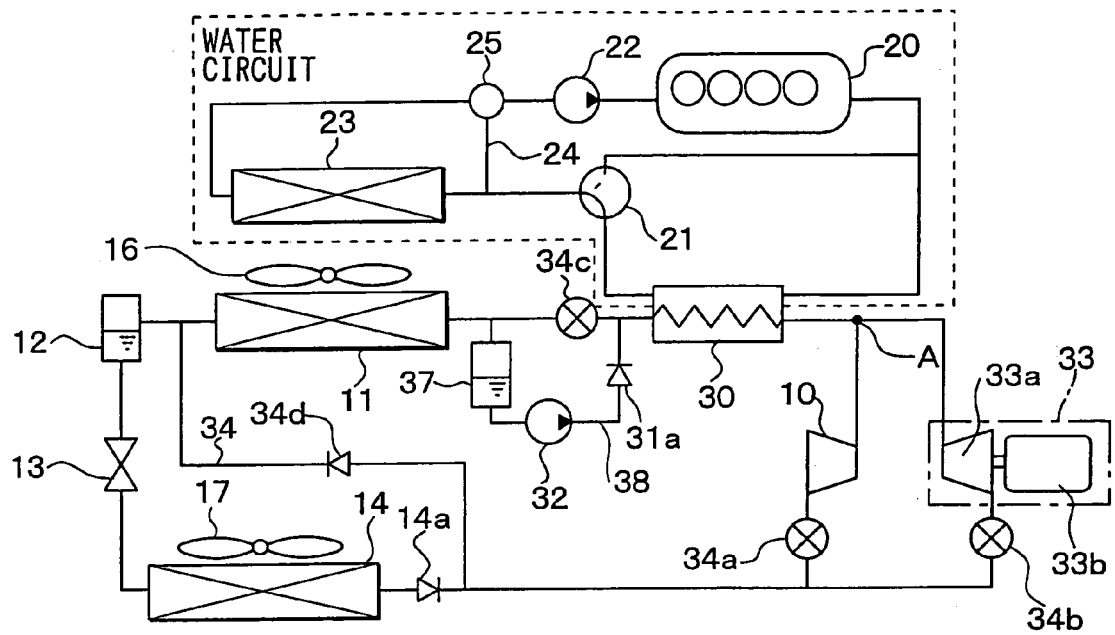
FIG. 9 is a schematic diagram of a Rankine vapor-compression refrigerant cycle system according to a sixth embodiment of the present invention.

The sixth embodiment of the present invention will be now described with reference to FIG. 9. In the sixth embodiment, as shown in FIG. 9, a second gas-liquid separator 37 and the liquid pump 32 are provided in a third bypass circuit 38. The second gas-liquid separator 37 is for separating the refrigerant flowing out of the radiator 11 into the gas phase refrigerant and the liquid phase refrigerant in the waste heat recovery operation. The liquid pump 32 provided in the third bypass circuit 38 is for guiding the refrigerant flowing out of an outlet of the second gas-liquid separator 37 to the heater 30 while bypassing the switching valve 34c. Further, the second bypass circuit 34 is connected to the radiator 11 at a position between the gas-liquid separator 12 (hereinafter referred to as a first gas-liquid separator 12) and the radiator 11.

Then, in the air conditioning operation, the liquid pump 32 is set at the stopped state, and the compressor 10 is operated while opening the switching valves 34a, 34c and closing the switching valve 34b. At the same time, a three-way valve 21 is operated, so that the engine cooling water is circulated while bypassing the heater 30.

As a result, the refrigerant is circulated in the order of the compressor 10→the heater 30→the radiator 11→the first gas-liquid separator 12→the decompression device 13→the evaporator 14→the compressor 10. Since the engine cooling water is not circulated to the heater 30, the refrigerant is not heated in the heater 30, so that the heater 30 functions merely as a refrigerant path.

Accordingly, a low-pressure refrigerant after being decompressed in the decompression device 13 evaporates by absorbing heat from air blowing into a room (e.g., passenger compartment), and the gas phase refrigerant, generated after the evaporation, is compressed in the compressor 10 to thereby reach a high temperature, and is cooled with air outside the room by the radiator 11 to be thereby condensed.

Further, in the waste heat recovery operation, the switching valves 34a, 34c are set at the closed state, the liquid pump 32 is operated, and the compressor 10 is stopped while opening the switching valve 34b. Further, the three-way valve 21 is operated so that the engine cooling water flowing out of the engine 20 is circulated through the heater 30.

As a result, the refrigerant is circulated in the order of the second gas-liquid separator 37→the third bypass circuit 38→the heater 30→the energy recovery unit 33 (expansion device 33a)→the second bypass circuit 34→the radiator 11→the second gas-liquid separator 37. In the waste heat recovery operation, the refrigerant flows in the radiator 11 in a direction reversed from that in the air conditioning operation.

Accordingly, a super-heated vapor refrigerant heated in the heater 30 flows into the expansion device 33a, and the super-heated vapor refrigerant that has flown into the expansion device 33a reduces an enthalpy thereof while performing isentropical expansion in the expansion device 33a. Hence the expansion device 33a provides the generator 33b with mechanical energy corresponding to the reduced portion of the enthalpy, and power generated by the generator 33b is stored in an electricity accumulator such as a battery, capacitor, and the like.

The present embodiment can be carried out with the use of the expending and compressing device 100 where the compressor 10 and the energy recovery unit 33 are integrated.

(Seventh Embodiment)

The seventh embodiment of the present invention will be now described with reference to FIG. 10.

In the above-described first to sixth embodiments of the present invention, the three-way valve 21 is disposed for changing-over between a case where the engine cooling water, recovering waste heat in the engine 20, is supplied to the heater 30 and a case where the engine cooling water is not supplied to the heater 30. However, in the seventh embodiment, as shown in FIG. 10, there is provided a refrigerant circuit 31b connecting the gas-liquid separator 12 directly to the expending and compressing device 100, without using the three-way valve 21. Further, the liquid pump 32 and the heater 30 are disposed in the refrigerant circuit 31b.

Accordingly, in the present embodiment, during the operation of the engine 20, the engine cooling water is always circulated to the heater 30. In this case, the control whether or not waste heat is recovered from the engine cooling water is performed by whether or not the liquid pump 32 is operated.

Further, when the expending and compressing device 100 is operated as a compressor, the control valve 36 functions as a discharge valve, in other word, as a check valve. When the expending and compressing device 100 is operated as an expansion device, the control valve 36 functions as a valve that opens.

Specific operations of the vapor-compression refrigerant cycle system according to the seventh embodiment will be now described hereinafter 1. Air Conditioning Operation In the air conditioning operation, the liquid pump 32 is set at the stopped state, and the switching valve 34c is opened. At the same time, the expending and compressing device 100 is operated by operating the generator 33b as an electric motor.

As a result, a refrigerant is circulated in the order of the expending and compressing device 100→the radiator 11→the gas-liquid separator 12→the decompression device 13→the evaporator 14→the expending and compressing device 100.

Accordingly, a low-pressure refrigerant after performing a pressure reduction in the decompression device 13 evaporates by absorbing heat from air blowing into a room. The gas phase refrigerant, generated after evaporation, is compressed in the expending and compressing device 100 to thereby reach a high temperature, and is cooled with air outside the room in the radiator 11 to be thereby condensed.

2. Waste Heat Recovery Operation

When the waste heat recovery operation mode is set, the switching valve 34c is set at the closed state, and the liquid pump 32 is operated.

As a result, the refrigerant is circulated in the order of the gas-liquid separator 12→the refrigerant circuit 31b→the heater 30→the expending and compressing device 100→the second bypass circuit 34→the radiator 11→the gas-liquid separator 12.

Accordingly, a super-heated vapor refrigerant heated in the heater 30 flows into the expending and compressing device 100. Therefore, the super-heated vapor refrigerant that has introduced into the expending and compressing device 100 reduces an enthalpy thereof while performing isentropical expansion in the expending and compressing device 100.

Hence the expending and compressing device 100 provides the generator 33b with mechanical energy corresponding to the reduced portion of the enthalpy, and power generated by the generator 33b is stored in an electricity accumulator such as a battery, capacitor, and the like.

As described in the foregoing, in the seventh embodiment, since the three-way valve 21 can be not used, a circuit for the engine cooling water can be simplified, and a production cost of the vapor-compression refrigerant cycle system can be reduced.

Figure 10:
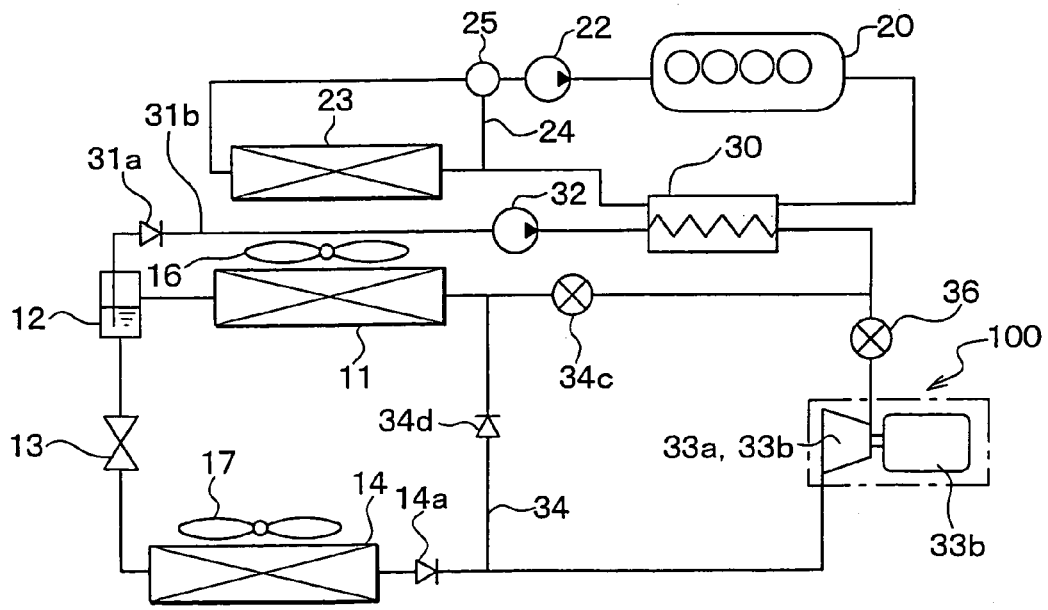
FIG. 10 is a schematic diagram of a Rankine vapor-compression refrigerant cycle system according to a seventh embodiment of the present invention.

FIG. 10 shows a case where the present embodiment is applied to the vapor-compression refrigerant cycle system as shown with reference to the fourth embodiment. However, the present embodiment is not limited thereto, and can be applied to any of the first to third, fifth, and sixth embodiments.

(Eighth Embodiment)

The eighth embodiment of the present invention will be now described with reference to FIG. 11. In the above-described first to seventh embodiments, only the engine cooling water has been used as a heat source for heating the refrigerant. However, in the present embodiment, as a heat source for heating the refrigerant, an exhaust gas from the engine 20 is also used in combination with the engine cooling water.

Figure 11:
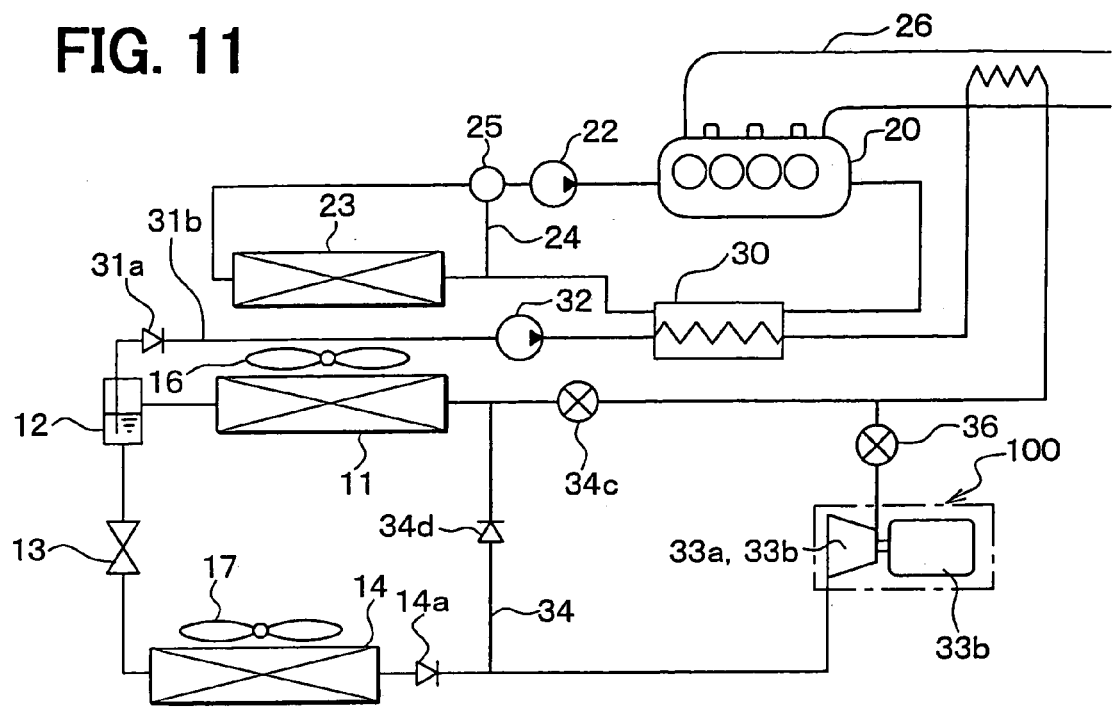
FIG. 11 is a schematic diagram of a Rankine vapor-compression refrigerant cycle system according to an eighth embodiment of the present invention.

In the eighth embodiment as shown in FIG. 11, the refrigerant circuit 31b for connecting the gas-liquid separator 12 directly to the expending and compressing device 100 passes an exhaust pipe 26 of the engine 20 so as to be in contact with the outer wall of the exhaust pipe 26. Therefore, the refrigerant heated by the engine cooling water is further heated by heat of the exhaust gas. The exhaust pipe 26 is used as an auxiliary heater in the eighth embodiment of the present invention.

Accordingly, in the present embodiment, because the refrigerant can be further heated by using the heat of the exhaust gas, it is possible to increase waste heat recovery quantity, and also to raise the temperature of the refrigerant. Thus, the energy recovery quantity and recovery efficiency of the expending and compressing device 100 can be enhanced.

(Ninth Embodiment)

The ninth embodiment of the present invention will be now described with reference to FIGS. 12–15. In the ninth embodiment, the parts similar to that of the above-described embodiments are indicated by the same reference numbers and detail description thereof is omitted.

The first bypass circuit 31 is a refrigerant path for guiding the liquid phase refrigerant, separated in the gas-liquid separator 12, toward a refrigerant inlet/outlet of the heater 30, on the side of the radiator 11. The first bypass circuit 31 is provided with the liquid pump 32 for circulating the liquid phase refrigerant and the check valve 31a for allowing the refrigerant to flow from the gas-liquid separator 12 only toward the heater 30. The liquid pump 32 is disposed such that the suction side thereof corresponds to the lower side of the gas-liquid separator 12. In the ninth embodiment, the liquid pump 32 is a motor-driven pump.

A refrigerant circuit arranged in parallel with the compressor 10 is provided with the energy recovery unit 33 for expanding the super-heated vapor refrigerant flowing out of the heater 30 to thereby recover thermal energy given to the heater 30 as mechanical (rotational) energy.

Further, in the ninth embodiment, the energy recovery unit 33 is constructed of the expansion device 33a and the generator 33b driven by the mechanical energy delivered from the expansion device 33a, similarly to the above-described first embodiment. Further, power generated by the generator 33b is stored in a battery 33c, for example.

Further, the second bypass circuit 34 is a refrigerant path for connecting the refrigerant outlet side of the expansion device 33a and the refrigerant inlet side of the radiator 11. The second bypass circuit 34 is provided with the check valve 34d for allowing the refrigerant to flow from the refrigerant outlet side of the expansion device 33a only toward the refrigerant inlet side of the radiator 11.

Further, the check valve 14a is for allowing the refrigerant to flow from a refrigerant outlet side of the evaporator 14 only toward the suction side of the compressor 10, and switching valves 34a to 34c are electromagnetic valves for opening/closing the refrigerant path.

Furthermore, a refrigerant circuit for connecting a refrigerant outlet side of the radiator 11 and the suction side of the liquid pump 32 is provided. In this refrigerant circuit, between one of liquid phase refrigerant outlets of the gas-liquid separator 12, on the side of the liquid pump 32, and the suction side of the liquid pump 32, there is provided with an inner heat exchanger 136 for performing heat exchange between a refrigerant in the refrigerant circuit and a low-pressure refrigerant after performing the pressure reduction in the decompression device 13. That is, the inner heat exchanger 136 has a first refrigerant passage communicated with the liquid phase refrigerant outlet of the gas-liquid separator 12 and the suction side of the liquid pump 32, and a second refrigerant passage through which the low-pressure refrigerant from the decompression device 13 flows. The low-pressure refrigerant heated in the inner heat exchanger 136 is returned to the refrigerant outlet side of the evaporator 14. Thus, the refrigerant in the refrigerant circuit between the liquid phase refrigerant outlet of the gas-liquid separator 12 and the suction side of the liquid pump 32 is cooled.

Further, a three-way valve 37 is for changing over between a case where the low-pressure refrigerant flowing out of the decompression device 13 is circulated to the evaporator 14, and a case where the low-pressure refrigerant flowing out of the decompression device 13 is circulated to the inner heat exchanger 136. The switching valves 34a to 34c, the three-way valves 21, 37, and the like are controlled by an electronic controller.

Now, the water pump 22 is used for circulation of the engine cooling water and the radiator 23 is a heat exchanger for cooling the engine cooling water through heat exchange between the engine cooling water and the outside air.

Figure 12:
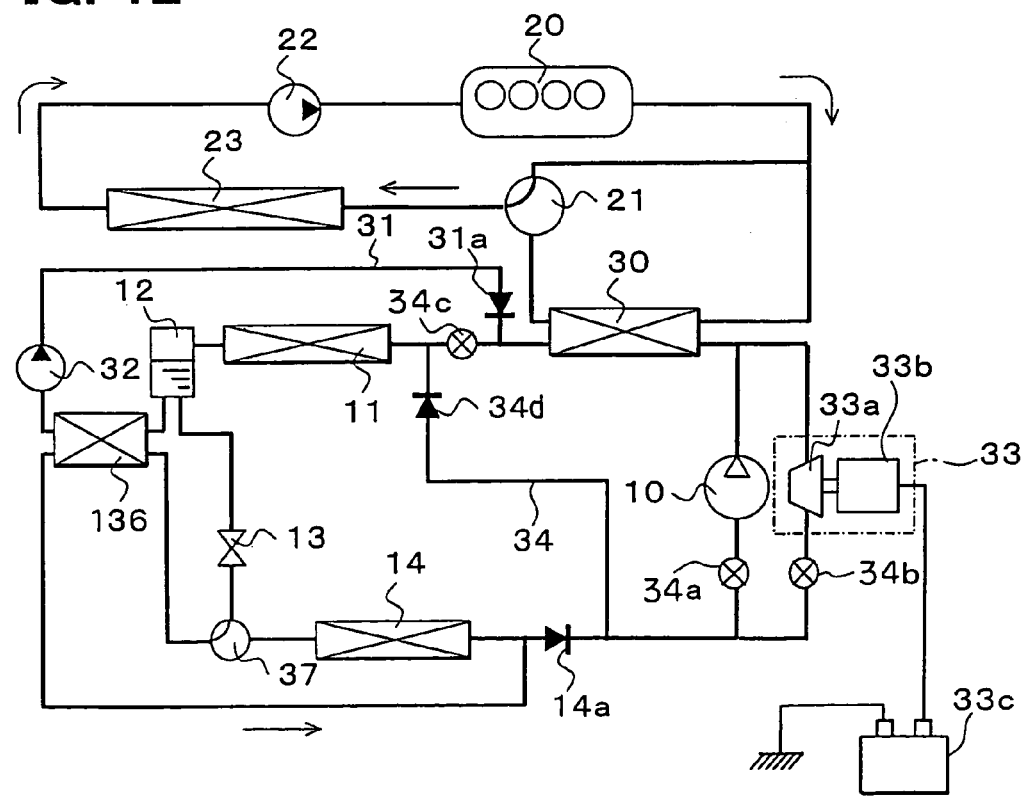
FIG. 12 is a schematic diagram of a Rankine vapor-compression refrigerant cycle system according a ninth embodiment of the present invention.

In FIG. 12, a water bypass circuit and a flow rate regulation valve provided in the water bypass circuit are omitted. The engine cooling water flows through the water bypass passage while bypassing the radiator 23, and the flow rate regulating valve is disposed for adjusting a flow rate of the engine cooling water flowing through the bypass circuit and a flow rate of the engine cooling water flowing through the radiator 23.

The water pump 22 is a mechanical pump driven by the motive power from the engine 20. However, needless to say, a motor-driven pump operated by an electric motor may be used instead of the mechanical pump.

Next, the operation of the vapor-compression refrigerant cycle system with the Rankine cycle and the refrigeration cycle according to the present embodiment is described.

2. Air Conditioning Operation (refer to FIG. 13)

This air conditioning operation is an operation mode in which the refrigerant is cooled by the radiator 11 while causing the evaporator 14 to exhibit refrigeration capacity.

In the present embodiment, the vapor-compression refrigerant cycle system is operated only for a cooling operation and a dehumidifying operation, utilizing cold derived from the vapor-compression refrigerant cycle, that is, a heat absorbing action. The vapor-compression refrigerant cycle system is not operated for a heating operation utilizing heat derived from the radiator 11. However, the operation of the vapor-compression refrigerant cycle system even at the time of the heating operation is the same as that at the time of the cooling operation and the dehumidifying operation, respectively.

Figure 13:
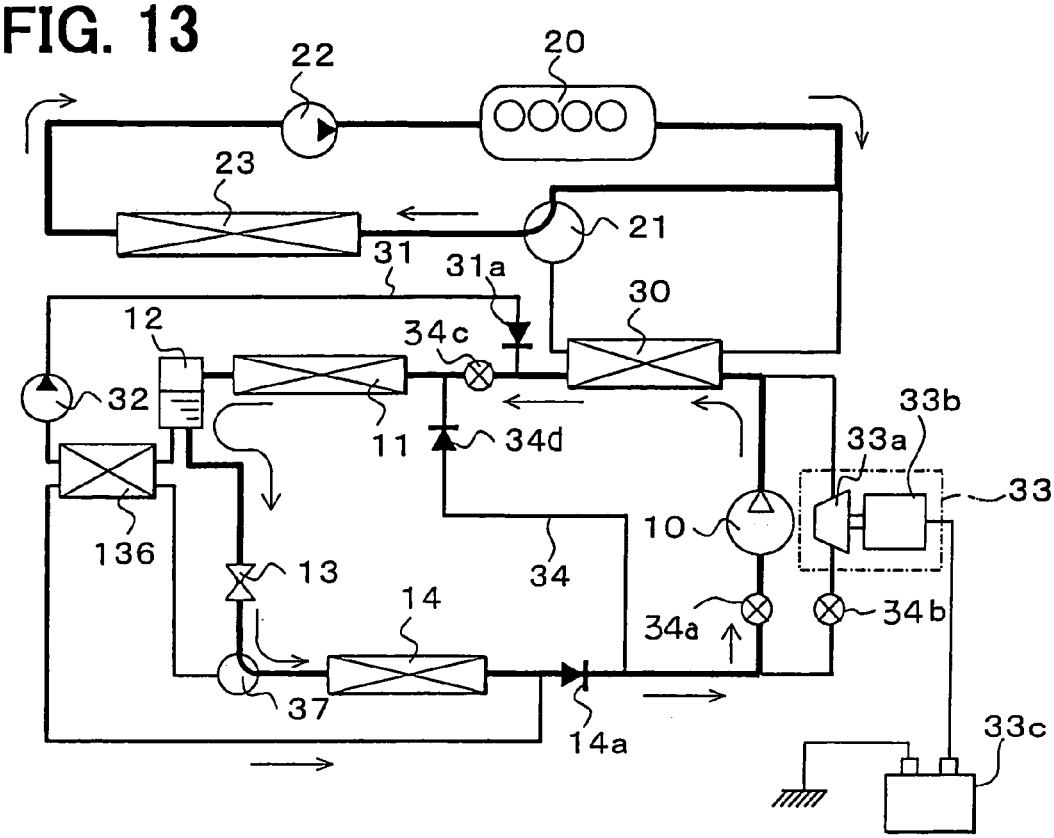
FIG. 13 is a schematic diagram of the Rankine vapor-compression refrigerant cycle system in an air conditioning operation, according the ninth embodiment of the present invention.

More specifically, in the air conditioning operation, the liquid pump 32 is set at a stopped state, and the compressor 10 is operated while opening the switching valves 34a, 34c and closing the switching valve 34b. At the same time, the three-way valve 21 is operated as shown in FIG. 13, thereby causing the engine cooling water to be circulated while bypassing the heater 30.

As a result, the refrigerant is circulated in the order of the compressor 10→the heater 30→the radiator 11 the gas-liquid separator 12→the decompression device 13→the evaporator 14→the compressor 10. Since the engine cooling water is not circulated to the heater 30, the refrigerant is not heated in the heater 30, so that the heater 30 functions merely as a refrigerant path.

Accordingly, the low-pressure refrigerant after performing the pressure reduction in the decompression device 13 evaporates by absorbing heat from air blowing into the passenger compartment, and the gas phase refrigerant, generated after evaporation in the evaporator 14, is compressed in the compressor 10 to thereby reach a high temperature, and is cooled with outside air by the radiator 11 to be thereby condensed.

In the present embodiment, freon (HFC134a) is used for the refrigerant. However, the refrigerant is not limited to HFC134a only when it is a refrigerant that can be liquefied on the high-pressure side in the refrigeration cycle.

2. Waste Heat Recovery Operation

The waste heat recovery operation is an operation mode wherein waste heat of the engine 20 is recovered as reusable energy by stopping the operation of an air-conditioning device, that is, the compressor 10. This waste heat recovery operation includes a steady operation mode for performing an energy recovery, and a start mode performed before proceeding to the steady operation mode.

The start mode is performed for a predetermined time from a time where a waste heat recovery start signal is issued by a switch or the like, for starting the waste heat recovery operation. Then, the steady operation mode is performed after the start mode is performed for the predetermined time.

Figure 14:
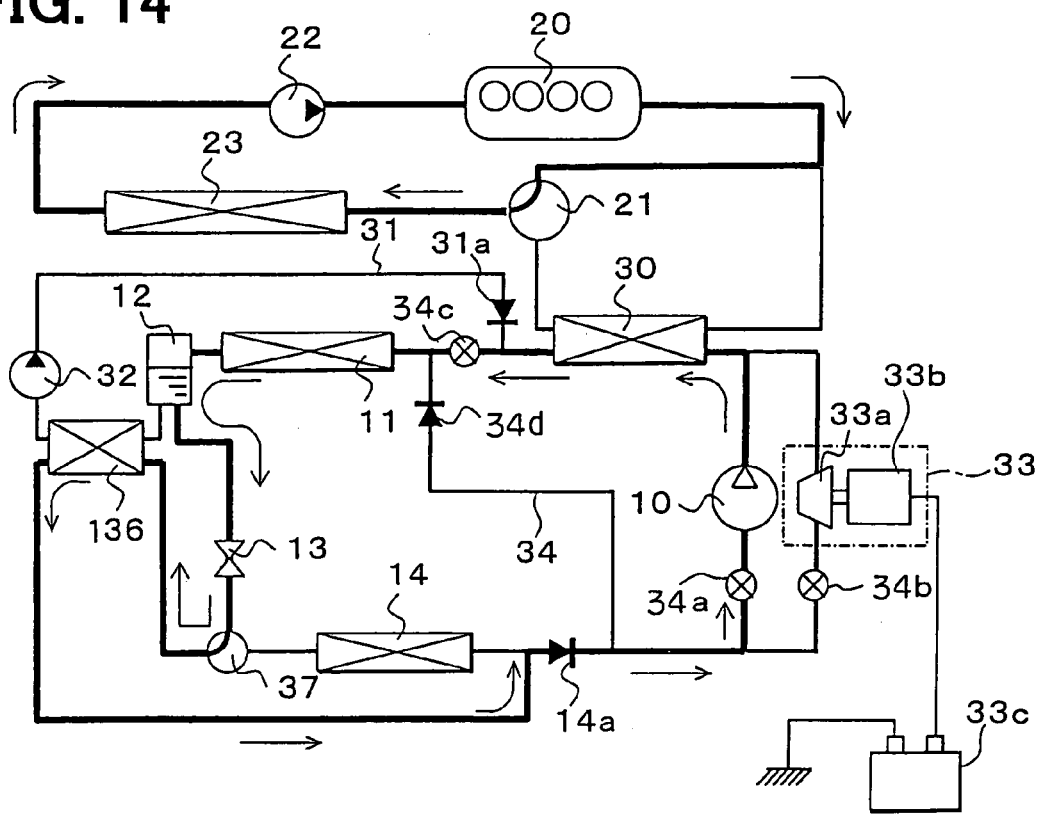
FIG. 14 is a schematic diagram of the Rankine vapor-compression refrigerant cycle system in a start mode of a waste heat recovery operation, according the ninth embodiment of the present invention.

First, the start mode of the waste heat recovery operation will be now described with reference to FIG. 14.

During this start mode in the waste heat recovery operation, the liquid pump 32 is set at the stopped state, and the compressor 10 is operated while opening the switching valves 34a, 34c and closing the switching valve 34b. At the same time, the three-way valve 37 is switched over as shown in FIG. 14. In this case, the low-pressure refrigerant after performing the pressure reduction in the decompression device 13 is circulated through the inner heat exchanger 136.

Similarly to the air conditioning operation, the engine cooling water is circulated so as to bypass the heater 30 in the start mode of the waste heat recovery operation.

As a result, in the start mode of the waste heat recovery operation, the refrigerant is circulated in the order of the compressor 10→the heater 30→the radiator 11 the gas-liquid separator 12→the decompression device 13→the inner heat exchanger 136→the compressor 10. Since the engine cooling water is not circulated to the heater 30, the refrigerant is not heated in the heater 30, so that the heater 30 functions merely as the refrigerant path.

Accordingly, the low-pressure refrigerant after performing the pressure reduction in the decompression device 13 evaporates by absorbing heat from the refrigerant (hereinafter referred to as a suction refrigerant) in the refrigerant circuit for connecting the liquid phase refrigerant outlet of the gas-liquid separator 12, and the suction side of the liquid pump 32. That is, the low-pressure refrigerant after performing the pressure reduction in the decompression device 13 evaporates by absorbing heat from the refrigerant in the first refrigerant passage of the inner heat exchanger 136. Therefore, the refrigerant in the refrigerant circuit between the liquid phase refrigerant outlet of the gas-liquid separator 12 and the suction side of the liquid pump 32 is cooled. On the other hand, the gas phase refrigerant, generated after evaporation in the inner heat exchanger 136, is compressed in the compressor 10 to thereby have a high temperature, and is cooled in the radiator 11 by air outside the room to be thereby condensed.

Next, the steady operation mode of the waste heat recovery operation will be now described with reference to FIG.

Figure 15:
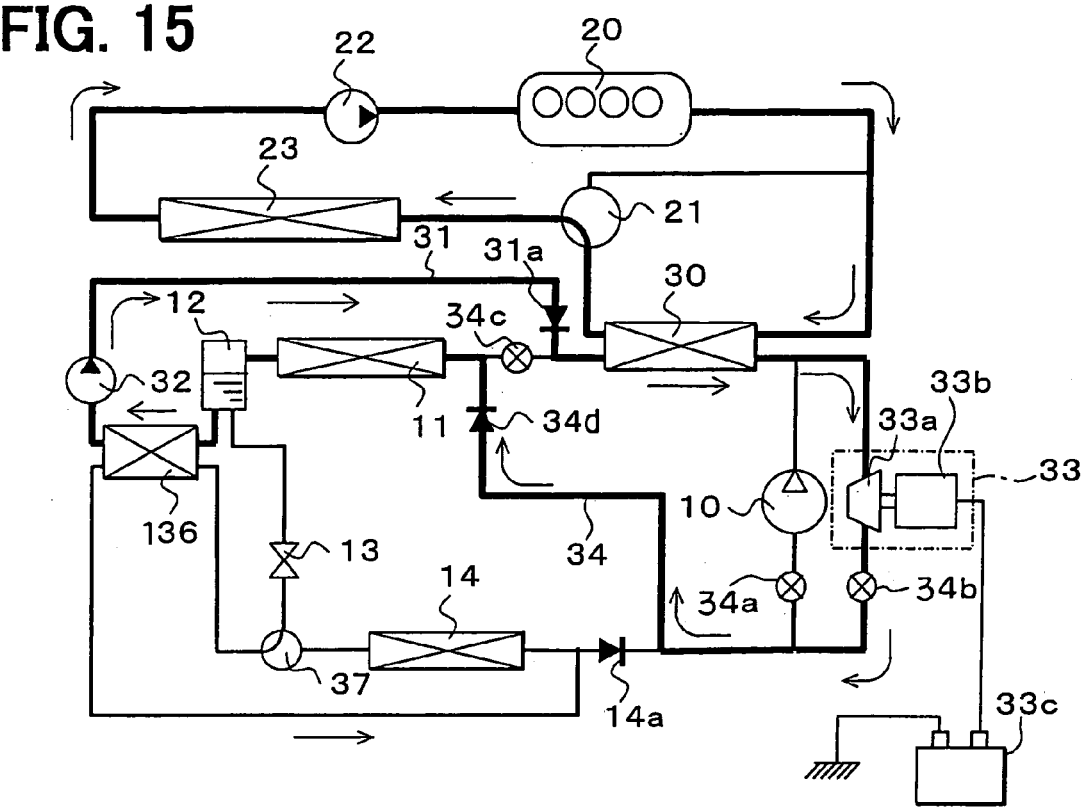
FIG. 15 is a schematic diagram of the Rankine vapor-compression refrigerant cycle system in a steady operation mode of the waste heat recovery operation, according the ninth embodiment of the present invention.

15. In the steady operation mode of the waste heat recovery operation, the switching valves 34*a*, 34*c* are set at the closed state, the liquid pump 32 is operated, and the compressor 10 is stopped while opening the switching valve 34*b*. At the same time, the three-way valve 21 is operated as shown in FIG. 15 to thereby cause the engine cooling water, flowing out of the engine 20, to be circulated through the heater 30.

As a result, the refrigerant is circulated in the order of the gas-liquid separator 12→the first bypass circuit 31→the heater 30→the energy recovery unit 33 (the expansion device 33*a*)→the second bypass circuit 34→the radiator 11 the gas-liquid separator 12.

Accordingly, the super-heated vapor refrigerant heated in the heater 30 flows into the expansion device 33*a* of the energy recovery unit 33, and the super-heated vapor refrigerant that has introduced into the expansion device 33*a* reduces an enthalpy thereof while performing isentropical expansion. Hence the expansion device 33*a* provides the generator 33*b* with mechanical energy corresponding to a reduced portion of the enthalpy, and power generated by the generator 33*b* is stored in an electricity accumulator such as the battery 33*c*, a capacitor, and the like.

Further, the refrigerant flowing out of the expansion device 33*a* is cooled in the radiator 11 and condensed to be thereby stored in the gas-liquid separator 12. The liquid phase refrigerant inside the gas-liquid separator 12 is sent out toward the heater 30 by the liquid pump 32.

Generally, the liquid pump 32 sends out the liquid phase refrigerant into the heater 30 at a pressure degree that is set so as not to permit a backward flow of the super-heated vapor refrigerant, generated after heated in the heater 30, toward the gas-liquid separator 12.

Next, the operation effect of the present embodiment is described hereinafter.

In the present embodiment, the suction refrigerant of the liquid pump 32 is cooled by the refrigeration cycle before the Rankine cycle is accurately started. Therefore, the refrigerant to be sucked into the liquid pump 32 can be changed into the liquid phase refrigerant certainly, and at the same time, the super-cooling degree of the liquid refrigerant to be sucked into the liquid pump 32 can be increased.

Accordingly, it is possible to prevent evaporation (boiling) of the suction refrigerant from occurring on the suction side of the liquid pump 32 certainly. With this, deterioration in the pump efficiency of the liquid pump 32 can be prevented. Thus, the Rankine cycle can be operated with high efficiency.

Further, by cooling the suction refrigerant with the use of the vapor-compression refrigeration cycle before actually starting up the Rankine cycle, the refrigerant that are scattered in the refrigerant circuits performs condensation in such a way as to collect in the inner heat exchanger 136. Therefore, it is possible to prevent the refrigerant from residing in the refrigerant circuits that are not used in the waste heat recovery operation. Consequently, this will lead to an increase in volume of the refrigerant available for effective use in the waste heat recovery operation, so that volume of the refrigerant to be filled in the vapor-compression refrigerant cycle system can be controlled to a necessary minimum.

Further, since the liquid pump 32 is disposed such that the suction side thereof corresponds to the lower side of the gas-liquid separator 12, a pressure due to the refrigerant's own weight acts on the suction side of the liquid pump 32. With this, it is possible to prevent a refrigerant's pressure on the suction side from dropping down to a boiling pressure or lower by the agency of a suction pressure, thereby preventing deterioration in the pump efficiency of the liquid pump 32.

(Tenth Embodiment)

The tenth embodiment of the present invention will be now described with reference to FIG. 16.

Figure 16:
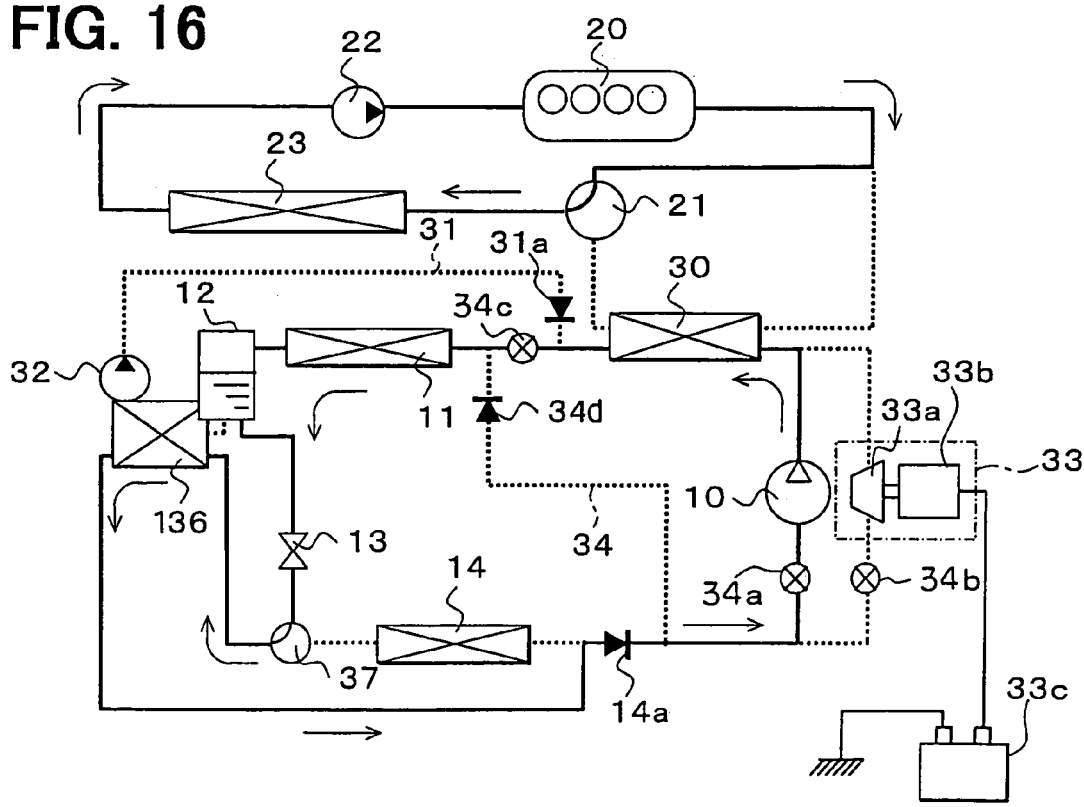
FIG. 16 is a schematic diagram of a Rankine vapor-compression refrigerant cycle system according a tenth embodiment of the present invention.

In the tenth embodiment of the present invention, the liquid pump 32, the gas-liquid separator 12, and the inner heat exchanger 136 are integrated with each other, as shown in FIG. 16. Alternatively, in the tenth embodiment, the liquid pump 32 and gas-liquid separator 12 are arranged so as to be close to the inner heat exchanger 136. Therefore, not only the suction refrigerant of the liquid pump 32 can be naturally cooled in the inner heat exchanger 136 but also the liquid pump 32 and gas-liquid separator 12 can be cooled in the start mode of the waste heat recovery operation.

As a result, it is possible to effectively cool the liquid pump 32 and gas-liquid separator 12 having a relatively large heat capacity. Accordingly, the super-cooling degree of the suction refrigerant to be sucked into the liquid pump 32 can be effectively increased, and deterioration in the pump efficiency of the liquid pump 32 can be prevented, thereby enabling the Rankine cycle to be operated with high efficiency.

In the tenth embodiment, the other parts are similar to the above-described ninth embodiment.

(Eleventh Embodiment)

The eleventh embodiment of the present invention will be now described with reference to FIG. 17.

Figure 17:
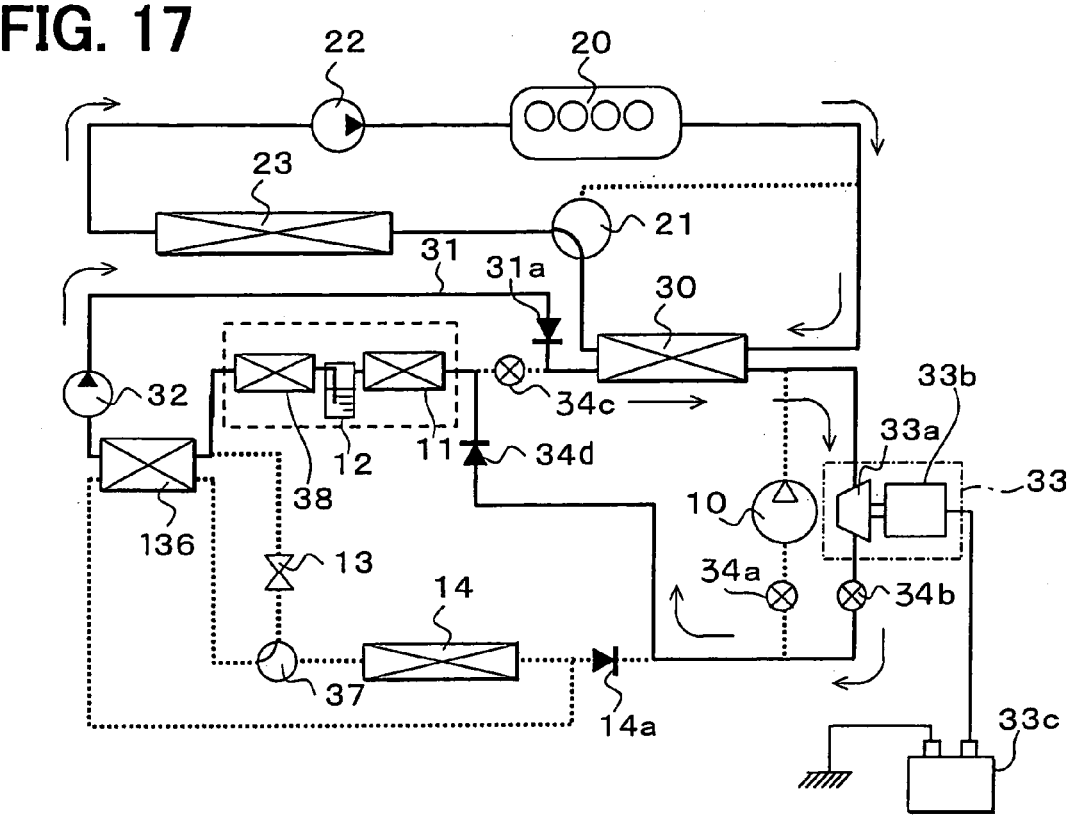
FIG. 17 is a schematic diagram of a Rankine vapor-compression refrigerant cycle system according an eleventh embodiment of the present invention.

As shown in FIG. 17, the eleventh embodiment of the present invention is provided with a super-cooler 38 for further cooling the liquid phase refrigerant from the gas-liquid separator 12 by using outside air. The super-cooler 38 is disposed between the gas-liquid separator 12 and the inner heat exchanger 136.

Further, in the present embodiment, the radiator 11, the gas-liquid separator 12, and the super-cooler 38 are integrated with each other by brazing or the like.

As a result, when the steady operation mode of the waste heat recovery operation is performed, the super-cooling degree of the suction refrigerant of the liquid pump 32 can be increased. Therefore, deterioration in pump efficiency of the liquid pump 32 can be stably prevented, thereby enabling the Rankine cycle to be operated with high efficiency. In the eleventh embodiment, the other parts are similar to those of the above-described ninth embodiment.

(Twelfth Embodiment)

Figure 18:
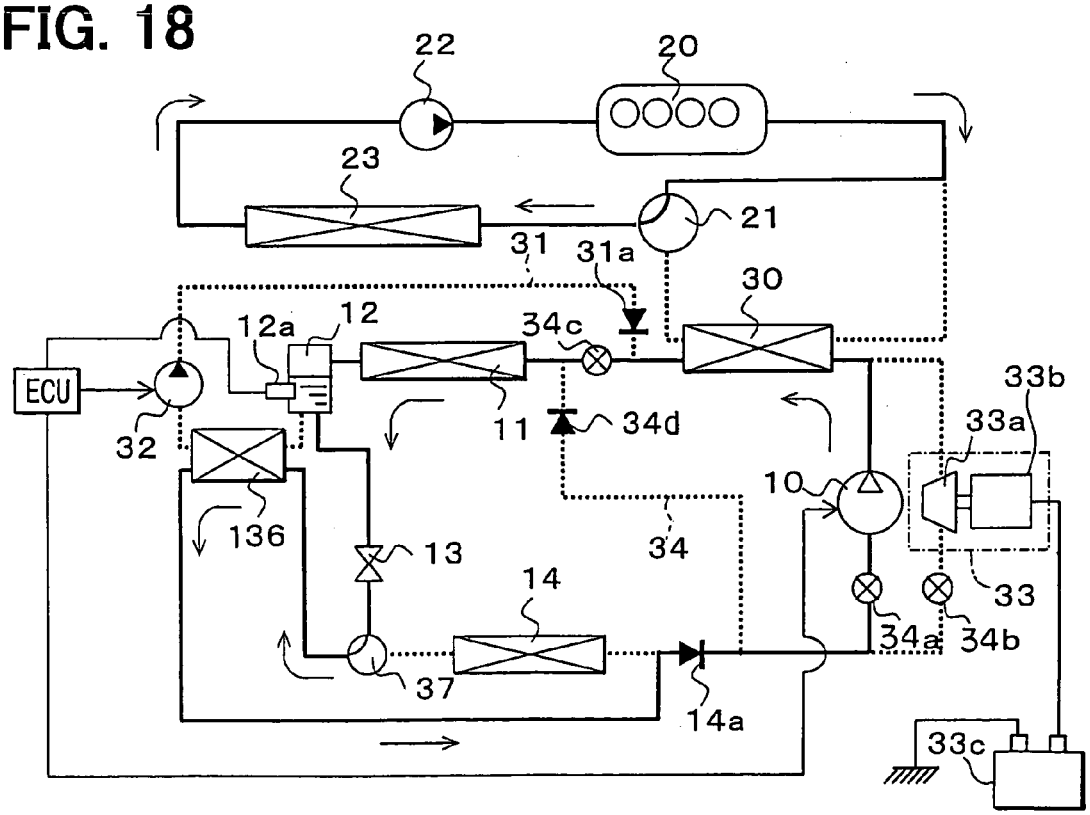
FIG. 18 is a schematic diagram of a Rankine vapor-compression refrigerant cycle system according a twelfth embodiment of the present invention.

The twelfth embodiment of the present invention will be now described with reference to FIG. 18. In the above-described ninth to eleventh embodiments, after performing the start mode of the waste heat recovery operation for the predetermined time, the steady operation mode of the waste heat recovery operation is performed. In the present embodiment, however, as shown in FIG. 18, the gas-liquid separator 12 is provided with a liquid surface sensor 12*a* for detecting a liquid surface position of the liquid phase refrigerant, and the start mode of the waste heat recovery operation is performed until the liquid surface position inside the gas-liquid separator 12 becomes higher than a predetermined value. That is, the start mode of the waste heat recovery operation is performed until a volume of liquid phase refrigerant to be sucked into the liquid pump 32 reaches a predetermined volume or more.

As a result, the liquid phase refrigerant to be sucked to the liquid pump 32 can be secured certainly. At the same, the start mode of the waste heat recovery operation will not be executed for a time period longer than necessary. Thus, a recovered waste heat quantity can be effectively increased.

In FIG. 18, the present invention of the twelfth embodiment is applied to the Rankine cycle according to the ninth embodiment. However, the operation of the start mode using the liquid surface sensor 12a of the gas-liquid separator 12 of the twelfth embodiment is not limited to be used for the ninth embodiment, and can be used for the other embodiments.

(Thirteenth Embodiment)

Figure 19:
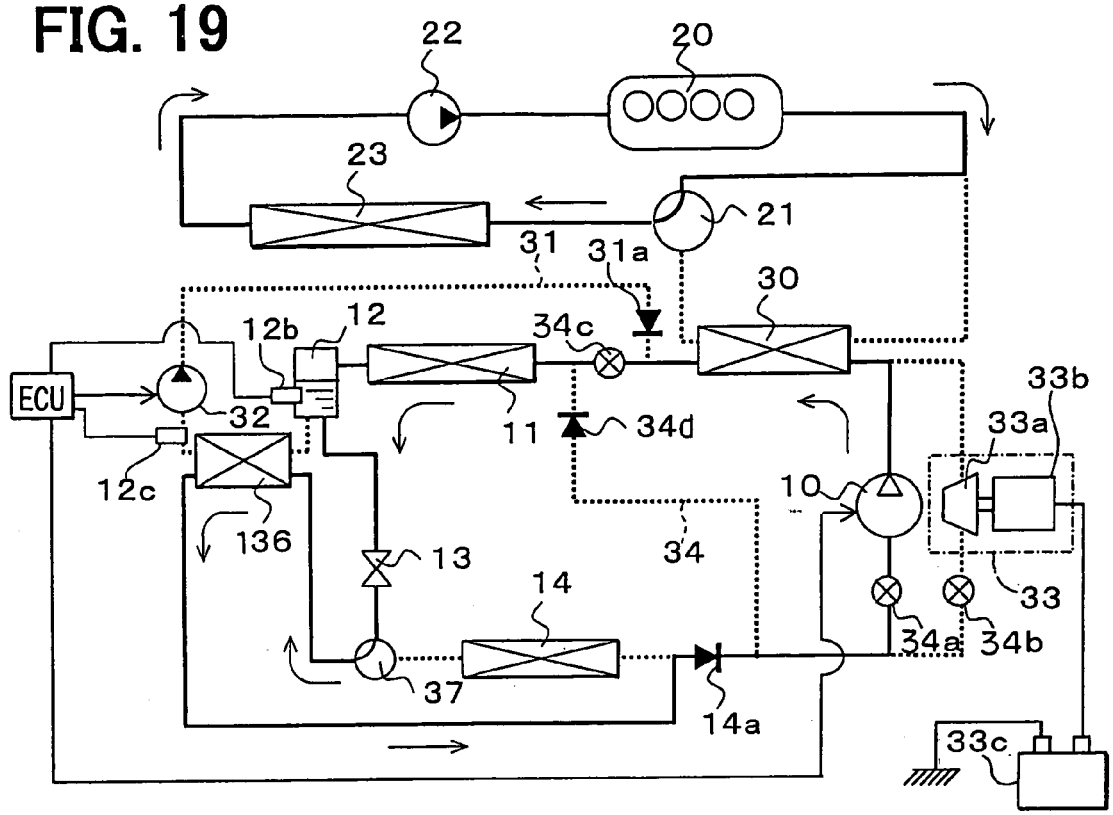
FIG. 19 is a schematic diagram of a Rankine vapor-compression refrigerant cycle system according a thirteenth embodiment of the present invention.

The thirteenth embodiment of the present invention will be now described with reference to FIG. 19. In the above-described ninth to eleventh embodiments, after performing the start mode of the waste heat recovery operation for the predetermined time, the steady operation mode of the waste heat recovery operation is performed. In the thirteenth embodiment, however, as shown in FIG. 19, the gas-liquid separator 12 is provided with a first temperature sensor 12b for detecting temperature of the liquid phase refrigerant. Further, a second temperature sensor 12c for detecting the temperature of the suction refrigerant of the liquid pump 32 is provided on the refrigerant outlet side of the inner heat exchanger 136 to thereby calculate a difference between respective detection temperatures of the temperature sensors 12b, 12c. Thus, a super-cooling degree of the liquid phase refrigerant to be sucked to the liquid pump 32 can be determined. In this embodiment, the start mode of the waste heat recovery operation is performed until the degree of the determined super-cooling exceeds a predetermined value.

As a result, the liquid phase refrigerant to be sucked to the liquid pump 32 can be secured certainly, and the start mode of the waste heat recovery operation will not be executed for a longer time than necessary. Therefore, a recovered waste heat quantity can be effectively increased.

In FIG. 19, the present invention of the twelfth embodiment is applied to the Rankine cycle according to the ninth embodiment. However, the operation of the start mode using the sensors 12b, 12c of the twelfth embodiment is not limited to be used for the ninth embodiment, and can be used for the other embodiments.

(Fourteenth Embodiment)

Figure 20:
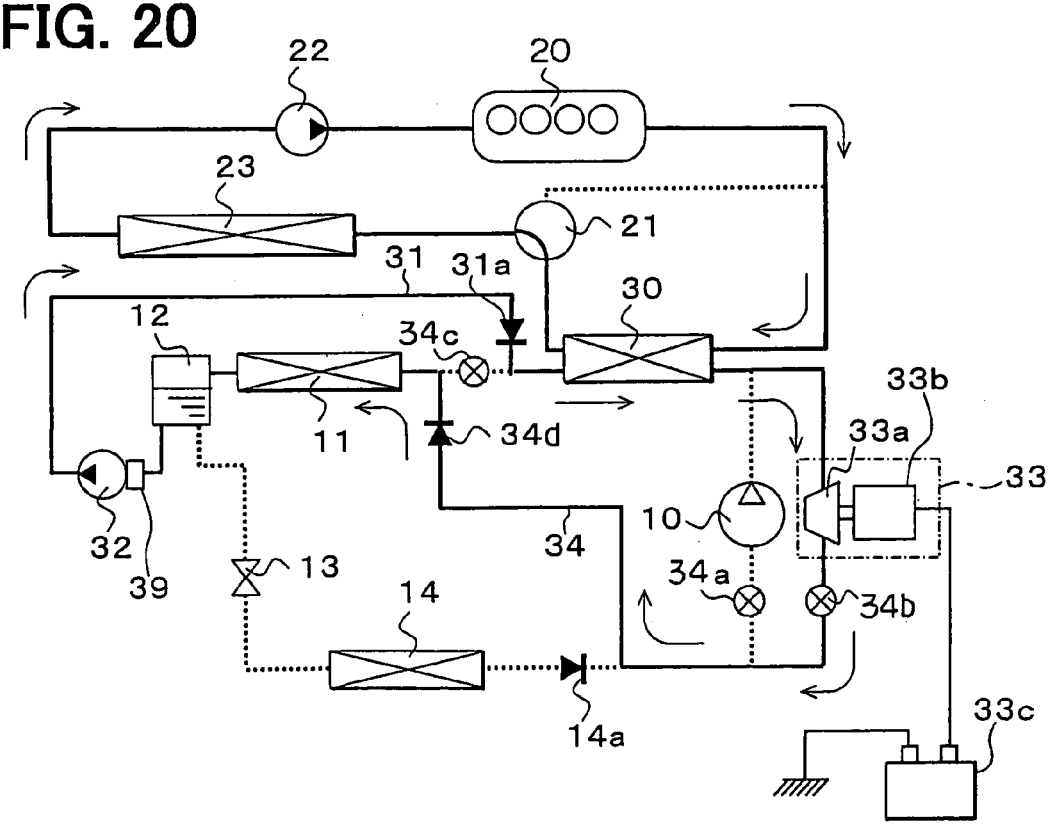
FIG. 20 is a schematic diagram of a Rankine vapor-compression refrigerant cycle system according a fourteenth embodiment of the present invention.

The fourteenth embodiment of the present invention will be now described with reference to FIG. 20.

In the above-described ninth to thirteenth embodiments, the suction refrigerant of the liquid pump 32 is cooled by using the vapor-compression refrigeration cycle. In the fourteenth embodiment, however, as shown in FIG. 20, the suction refrigerant of the liquid pump 32 is cooled by an electronic refrigerator 39 taking advantage of Peltier effect.

As a result, the suction refrigerant of the liquid pump 32 is cooled by the electronic refrigerator 39 that is smaller in size as compared with the vapor-compression refrigeration cycle. Therefore, it is possible to improve mounting performance of the Rankine cycle on a vehicle.

Thus, in the present embodiment, during the start mode prior to the steady operation mode of the waste heat recovery operation, the suction refrigerant of the liquid pump 32 is cooled by the electronic refrigerator 39 similarly to the above-described ninth to thirteenth embodiments. The fourteenth embodiment, however, is not limited thereto, and the suction refrigerant of the liquid pump 32 can be cooled even in the steady operation mode.

Furthermore, in a case where the suction refrigerant of the liquid pump 32 has a sufficient super-cooling degree at the time of a re-starting and the like, immediately after stoppage of the operation, the electronic refrigerator 39 may be stopped even at a start time. In the fourteenth embodiment, the electronic refrigerator 39 can be used for a vapor-compression refrigerant cycle system including the refrigeration cycle and the Rankine cycle.

(Fifteenth Embodiment)

Figure 21:
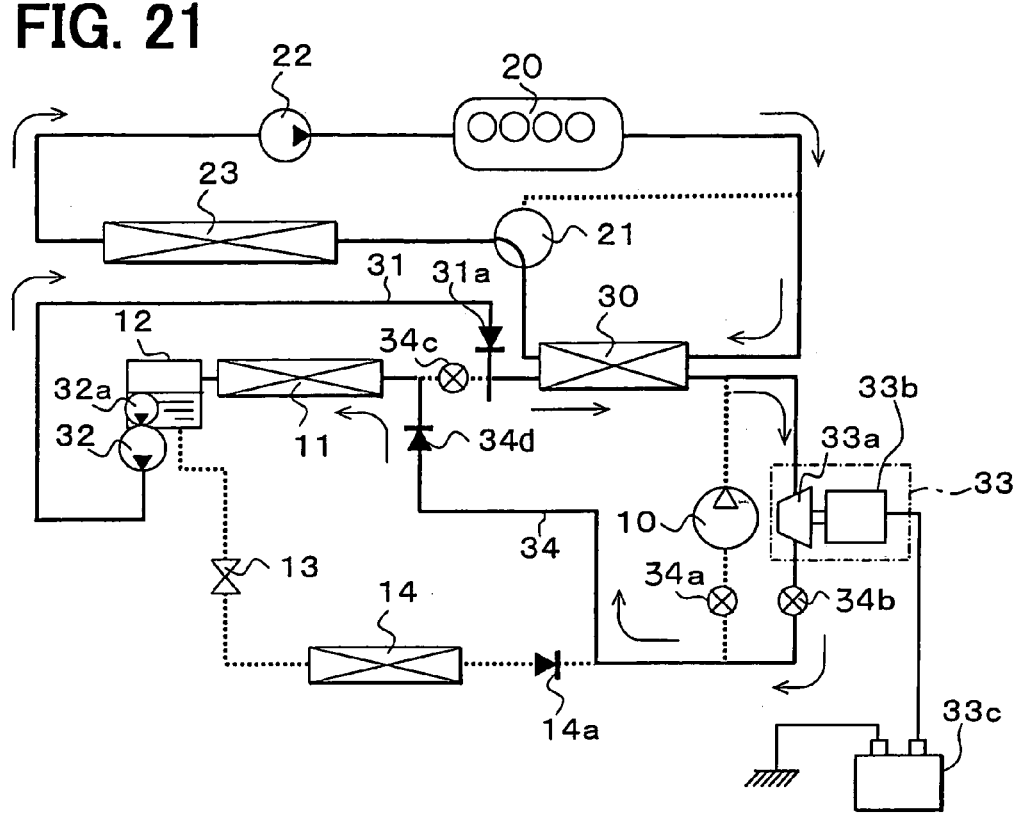
FIG. 21 is a schematic diagram of a Rankine vapor-compression refrigerant cycle system according a fifteenth embodiment of the present invention.

The fifteenth embodiment of the present invention will be now described with reference to FIG. 21.

In the above-described ninth to fourteenth embodiments, boiling of the suction refrigerant is prevented by cooling the suction refrigerant of the liquid pump 32. In the fifteenth embodiment, however, as shown in FIG. 10, a feed pump 32a is disposed on the suction side of a liquid pump 32. With this arrangement, a pressure of the liquid pump 32, on the suction side of the liquid pump 32, is prevented from dropping down to a boiling pressure or lower, thereby preventing deterioration in pump efficiency of the liquid pump 32.

Further, the feed pump 32a is housed in the gas-liquid separator 12 such that a suction inlet of the feed pump 32a is positioned not higher than a liquid surface inside the gas-liquid separator 12. At the same time, the liquid pump 32 and the feed pump 32a are integrated with each other by directly connecting the suction side of the liquid pump 32 to the discharge side of the feed pump 32a.

Furthermore, in the present embodiment, the liquid pump 32 and the feed pump 32a are simultaneously started up (operated) or stopped. However, in a case where the liquid phase refrigerant does not exists on the suction side of the feed pump 32a, that is, inside the gas-liquid separator 12, at the time of start-up of the Rankine cycle (waste heat recovery operation), the operation mode is changed into the start mode to thereby store the liquid phase refrigerant in the gas-liquid separator 12 by operating the vapor-compression refrigeration cycle. When not less than a predetermined volume of the liquid phase refrigerant is stored in the gas-liquid separator 12, the vapor-compression refrigeration cycle is stopped, and the liquid pump 32 and feed pump 32a are operated.

In the above-described fifteenth embodiment, the other parts are similar to the above-described ninth embodiment.

(Sixteenth Embodiment)

Figure 22:
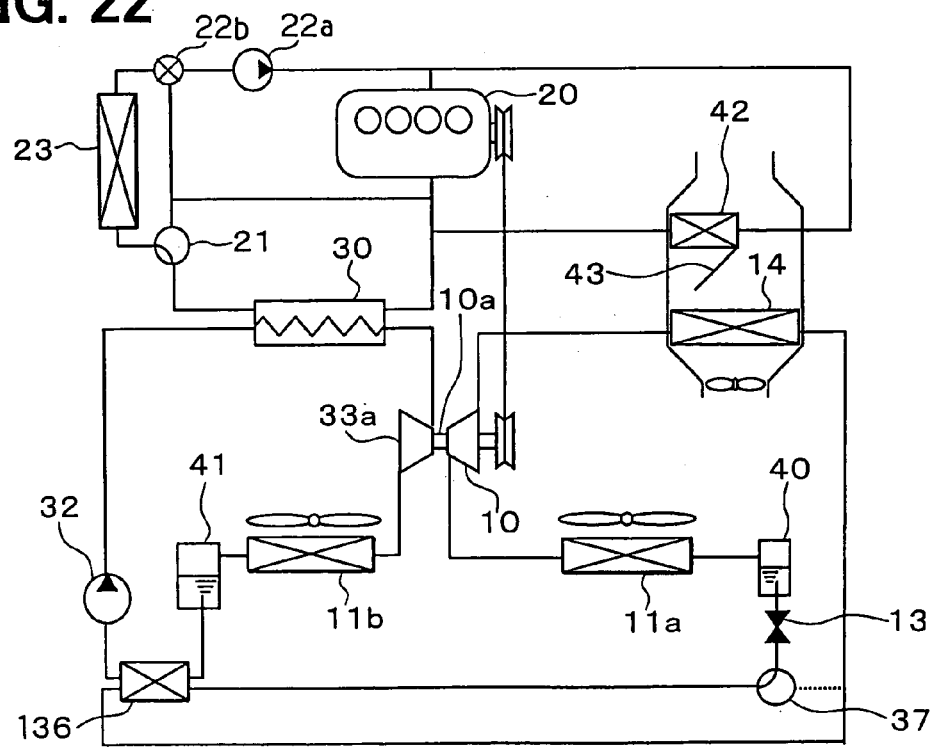
FIG. 22 is a schematic diagram of a Rankine vapor-compression refrigerant cycle system according a sixteenth embodiment of the present invention.

The sixteenth embodiment of the present invention will be now described with reference to FIG. 22.

In the above-described ninth to fifteenth embodiments, the single radiator 11 is used as a condenser for the vapor-compression refrigeration cycle and a condenser for the Rankine cycle. In the sixteenth embodiment, however, as shown in FIG. 22, a radiator 11a for a vapor-compression refrigeration cycle and a radiator 11b for a Rankine cycle are individually provided, thereby enabling the vapor-compression refrigeration cycle to be operated independently from the Rankine cycle.

Consequently, in the present embodiment, there are provided a gas-liquid separator 40 for the vapor-compression refrigeration cycle, and a gas-liquid separator 41 for the Rankine cycle while the expansion device 33a is linked with the compressor 10 through a power transmission means for intermittently transferring a motive power, such as an electronic clutch 10a or the like.

In a case where the Rankine cycle is operated while the vapor-compression refrigeration cycle is in operation, energy recovered from waste heat is delivered to the compressor 10 by engaging the electronic clutch 10a. On the other hand, in a case where the vapor-compression refrigeration cycle is operated while the Rankine cycle is not operated, the compressor 10 is operated by the engine 20.

Further, in a case where it is difficult to operate the compressor 10 by using only the energy recovered from waste heat, the compressor 10 can be operated by use of both the expansion device 33a and the engine 20.

In addition, in the present embodiment, because the radiator 11a for the vapor-compression refrigeration cycle is operable independently from the radiator 11b for the Rankine cycle, it is possible to introduce the engine cooling water having a high temperature (e.g., 80 to 110° C.), to the heater 30, in the start mode for cooling the suction refrigerant of the liquid pump 32 by use of the vapor-compression refrigeration cycle.

Accordingly, in the present embodiment, the heater 30 is operated as a vapor generator for generating super-heated vapor refrigerant by introducing the engine cooling water having the high temperature (80 to 110° C.) into the heater 30. In this case, the refrigerant residing in the heater 30 is circulated toward the gas-liquid separator 41 and the inner heat exchanger 136, so that the liquid phase refrigerant can be easily stored on the suction side of the liquid pump 32.

Further, a time period for performing the start mode is the same as that for any of the ninth, twelfth and thirteenth embodiments.

In this embodiment, an air heater 42 is disposed in an air conditioning case downstream of the evaporator 14, for heating air blown into a room by use of the engine cooling water as a heat source. Further, an air mixing door 43 is disposed for controlling the temperature of air blown into the room through an adjustment of an amount of hot air passing through the heater 42, and an amount of cool air bypassing the heater 42. Further, in FIG. 22, a water pump 22a, a switching valve 22b and the valve 21 are provided in the water circuit for circulating the engine cooling water.

Although the present invention has been fully described in connection with the preferred embodiments thereof with reference to the accompanying drawings, it is to be noted that various changes and modifications will become apparent to those skilled in the art.

For example, in the above-described embodiments, the energy recovered by the energy recovery unit 33 is stored in the electricity accumulator, however, the same can be stored in the form of kinetic energy of a flywheel or in the form of mechanical energy such as elastic energy of a spring, and the like.

Further, in the first to third embodiments (FIGS. 1, 4, and 5, respectively), the heater 30 is disposed in series between the radiator 11 and the compressor 10. However, since the refrigerant is heated in the heater 30 only at the time of the waste heat recovery operation (Rankine cycle), even if the heater 30 is disposed in series between the radiator 11 and the expansion device 33a (for example, at a point in the refrigerant circuit, closer to the expansion device 33a, than the point A in FIG. 1), it is possible to operate the Rankine cycle.

Still further, as the heat source for heating the refrigerant in the heater 30, waste heat generated by various equipments mounted on the vehicle, for example, an intake heat of a turbine, a generated heat of an inverter, and a waste heat of an auxiliary equipment can be used. And the refrigerant may be heated in the heater 30 by using either only one heat source or a plurality of heat sources in combination.

The present invention is not limited to the above-described embodiments, and at least two of the embodiments among the above-described embodiments may be combined in carrying out the present invention.

Such changes and modifications are to be understood as being within the scope of the present invention as defined by the appended claims.

What is claimed is:

1. A vapor-compression refrigerant cycle system comprising:
   a compressor for sucking and compressing refrigerant;
   a radiator, provided at a refrigerant discharge side of the compressor, for cooling the refrigerant, the radiator being connected to a refrigerant discharge side of the compressor through a refrigerant circuit;
   a decompression device for decompressing refrigerant flowing out of the radiator;
   an evaporator for evaporating the refrigerant after being decompressed in the decompression device, by performing heat exchange with a first fluid;
   a refrigerant shutting unit disposed in the refrigerant circuit to shut a refrigerant flow from the refrigerant discharge side of the compressor to the radiator;
   a heater for heating refrigerant, by performing heat exchange with a second fluid different from the first fluid;
   a refrigerant supply means for supplying refrigerant to the heater while bypassing the refrigerant shutting unit, the refrigerant supplying means supplies refrigerant from a refrigerant outlet side of the radiator to the heater; and
   an energy recovery unit for expanding the refrigerant flowing out of the heater to recover thermal energy in the refrigerant from the heater, wherein:
   when a refrigeration cycle where the evaporator has a refrigeration capacity is set, the refrigerant is circulated in this order of the compressor→the radiator→the decompression device→the evaporator→the compressor;
   when a Rankine cycle where the energy recovery unit recovers the thermal energy is set, the refrigerant shutting unit shuts the refrigerant flow from the refrigerant discharge side of the compressor to the radiator, and the refrigerant is circulated by the refrigerant supply means in this order of the heater→the energy recovery unit→the radiator→the heater;
   the refrigerant circuit has a first refrigerant path between a refrigerant discharge port of the compressor and the refrigerant shutting unit, and at least a part of the first refrigerant path in the refrigeration cycle is used as a part of a refrigerant suction path for drawing refrigerant to the energy recovery unit in the Rankine cycle; and
   at least a part of a second refrigerant path between a refrigerant suction port of the compressor and the evaporator in the refrigeration cycle is used as a part of a refrigerant discharge path of the energy recovery unit in the Rankine cycle.

2. The vapor-compression refrigerant cycle system according to claim 1, wherein:
   the compressor and the energy recovery unit are integrated to form a compressor device; and
   the compressor device functions as the energy recovery unit when the refrigerant flowing out of the heater flows into the compressor device.

3. The vapor-compression refrigerant cycle system according to claim 1, wherein the energy recovery unit is connected in parallel with the compressor.

4. The vapor-compression refrigerant cycle system according to claim 1, wherein the heater is provided in the refrigerant circuit connecting the compressor and the radiator.

5. The vapor-compression refrigerant cycle system according to claim 1, further comprising a gas-liquid separator for separating the refrigerant flowing out of the radiator into gas refrigerant and liquid refrigerant, wherein,
in the Rankine cycle, the liquid refrigerant separated in the gas-liquid separator is supplied to the heater by the refrigerant supply means.

6. The vapor-compression refrigerant cycle system according to claim 1, further comprising energy storage means for storing energy recovered by the energy recovery unit.

7. The vapor-compression refrigerant cycle system according to claim 6, wherein the energy storage means includes a capacitor.

8. The vapor-compression refrigerant cycle system according to claim 6, wherein the energy storage means stores the energy recovered in the energy recovery unit as a mechanical energy.

9. The vapor-compression refrigerant cycle system according to claim 1, wherein the energy recovery unit generates an electric energy by use of the recovered energy.

10. The vapor-compression refrigerant cycle system according to claim 1, wherein the compressor is driven by an electric motor.

11. The vapor-compression refrigerant cycle system according to claim 1, wherein the compressor is disposed to be driven by plural kinds of driving sources.

12. The vapor-compression refrigerant cycle system according to claim 1, wherein the compressor is disposed to be driven by a driving source other than an electric motor.

13. The vapor-compression refrigerant cycle system according to claim 1, further comprising an auxiliary heater that is provided separately from the heater, for heating the refrigerant by using heat of an exhaust gas discharged from a heat engine.

14. The vapor-compression refrigerant cycle system according to claim 1, wherein the heater heats the refrigerant by using waste heat generated by a heat engine.

15. The vapor-compression refrigerant cycle system according to claim 14, wherein the heater heats the refrigerant by using heat of exhaust gas discharged from the heat engine.

16. The vapor-compression refrigerant cycle system according to claim 1, wherein the heater heats the refrigerant by using waste heat generating by equipment mounted on a vehicle.

17. The vapor-compression refrigerant cycle system according to claim 1, wherein the heater heats the refrigerant by use of a plurality of heat sources.

18. The vapor-compression refrigerant cycle system according to claim 1, wherein the refrigerant contains at least one substance selected from the group consisting of HFC134a, HFC152a, butane, propane, and ammonia, as a main constituent of the refrigerant.

19. The refrigerant cycle system according to claim 1, wherein the energy recovery unit has a refrigerant outlet side which is coupled to a refrigerant path between the refrigerant shutting unit and the radiator.

20. A refrigerant cycle system comprising:
a compression/expansion device, which has a high pressure port and a low pressure port, and which functions as a compressor for compressing refrigerant drawn from the low pressure port and as an energy recovery unit for expanding refrigerant drawn from the high pressure port to recovery thermal energy in refrigerant;
a radiator, located at a side of the high pressure port of the compression/expansion device, for cooling the refrigerant;
a decompression device foe decompressing refrigerant flowing out of the radiator;
an evaporator, located downstream of the decompression device, for evaporating refrigerant from the decompression device by heat-exchanging with air for air-conditioning;
a refrigerant shutting unit located in a refrigerant circuit to shut a refrigerant flow from the high pressure port of the compression/expansion device to the radiator when the compression/expansion device is operated as the energy recovering unit;
a first bypass circuit which connects a refrigerant discharge side of the radiator to the side of the high pressure port of the compression/expansion device while bypassing the refrigerant shutting unit;
a pump for supplying refrigerant to flow through the first bypass circuit from the refrigerant discharge side of the radiator;
a heater for heating the refrigerant supplied by the pump, using a heat source;
a second bypass circuit which connects the low pressure port of the compression/expansion device to the refrigerant suction side of the radiator in the refrigerant circuit;
a control means for controlling a refrigerant flow, wherein
when the compression/expansion device operates as the compressor, the control means controls the refrigerant flow to circulate in this order of the compression/expansion device, the radiator, the decompression device, the evaporator and the compression/expansion device, and
when the compression/expansion device operates as the energy recovery unit, the control means controls the refrigerant flow to circulate in this order of the heater, the compression/expansion device, the second bypass circuit, the radiator and the heater.

21. The refrigerant cycle system according to claim 20, wherein the heater is located between the refrigerant shutting unit and the high pressure port of the compression/expansion device.

22. The refrigerant cycle system according to claim 20, wherein
the first bypass circuit is joined to a refrigerant path between the refrigerant shutting unit and the heater, such that a refrigerant flow in the heater, when the compression/expansion device operates as the compressor, is opposite to a refrigerant flow in the heater when the compression/expansion device operates as the energy recovery unit.

23. The refrigerant cycle system according to claim 20, further comprising
a gas-liquid separator located at the refrigerant discharge side of the radiator,
wherein the first bypass circuit is jointed to the gas-liquid separator such that the pump pumps liquid refrigerant in the gas-liquid separator.

24. The refrigerant cycle system according to claim 23, wherein the gas-liquid separator is located between the radiator and the decompression device.

25. The refrigerant cycle system according to claim 20, wherein the heater is separated from the evaporator.

* * * * *